(12) United States Patent
Colenbrander

(10) Patent No.: US 11,943,281 B2
(45) Date of Patent: *Mar. 26, 2024

(54) SYSTEMS AND METHODS FOR USING A DISTRIBUTED GAME ENGINE

(71) Applicant: Sony Interactive Entertainment LLC, San Mateo, CA (US)

(72) Inventor: Roelof Roderick Colenbrander, Costa Mesa, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/972,263

(22) Filed: Oct. 24, 2022

(65) Prior Publication Data

US 2023/0038618 A1 Feb. 9, 2023

Related U.S. Application Data

(63) Continuation of application No. 17/326,599, filed on May 21, 2021, now Pat. No. 11,496,551, which is a continuation of application No. 16/681,337, filed on Nov. 12, 2019, now Pat. No. 11,044,306, which is a continuation of application No. 15/477,341, filed on Apr. 3, 2017, now Pat. No. 10,491,666.

(51) Int. Cl.
| | |
|---|---|
| *A63F 13/352* | (2014.01) |
| *A63F 13/35* | (2014.01) |
| *H04L 67/01* | (2022.01) |
| *H04L 67/10* | (2022.01) |
| *G06F 9/50* | (2006.01) |

(52) U.S. Cl.
CPC .............. *H04L 67/10* (2013.01); *A63F 13/35* (2014.09); *A63F 13/352* (2014.09); *H04L 67/01* (2022.05); *A63F 2300/513* (2013.01); *A63F 2300/534* (2013.01); *G06F 9/5072* (2013.01)

(58) Field of Classification Search
CPC .......... H04L 67/10; H04L 67/01; A63F 13/35; A63F 13/352; A63F 2300/513; A63F 2300/534; G06F 9/5072
See application file for complete search history.

(56) References Cited

U.S. PATENT DOCUMENTS

| | | | | |
|---|---|---|---|---|
| 2013/0116044 | A1* | 5/2013 | Schwartz | A63F 13/35 463/29 |
| 2014/0024464 | A1* | 1/2014 | Belakovsky | A63F 13/60 463/43 |
| 2016/0294921 | A1* | 10/2016 | Meng | A63F 13/352 |

* cited by examiner

*Primary Examiner* — Cheikh T Ndiaye
(74) *Attorney, Agent, or Firm* — Penilla IP, APC

(57) ABSTRACT

A method for using a distributed game engine includes receiving a request from a user account via a computer network to play a game, identifying processing power assignment for the user account, and determining node assembly for the user account to utilize two or more processing nodes for the play of the game based on the processing power assignment. The method further includes initializing the two or more processing nodes for execution of the game for the user account. The operation of initializing is performed to set up a transfer of processing code for the game from one processing nods to another processing node. The method includes defining an internal communication channel between the two or more processing nodes for exchange of state information of the game. The exchange of state information is performed to enable shared processing of the game by the two or more nodes.

21 Claims, 20 Drawing Sheets

SYSTEMS AND METHODS FOR USING A DISTRIBUTED GAME ENGINE

CLAIM OF PRIORITY

The present patent application is a continuation of and claims the benefit of and priority, under 35 USC § 120, to U.S. patent application Ser. No. 17/326,599, filed on May 21, 2021, and titled "SYSTEMS AND METHODS FOR USING A DISTRIBUTED GAME ENGINE", which is a continuation of and claims the benefit of and priority, under 35 USC § 120, to U.S. patent application Ser. No. 16/681,337, filed on Nov. 12, 2019, titled "SYSTEMS AND METHODS FOR USING A DISTRIBUTED GAME ENGINE", and now issued as U.S. Pat. No. 11,044,306, which is a continuation of and claims the benefit of and priority, under 35 USC § 120, to U.S. patent application Ser. No. 15/477,341, filed on Apr. 3, 2017, titled "SYSTEMS AND METHODS FOR USING A DISTRIBUTED GAME ENGINE", and now issued as U.S. Pat. No. 10,491,666, all of which are incorporated by reference herein in their entirety.

FIELD

The present disclosure relates to systems and methods for using a distributed game engine.

BACKGROUND

A variety of devices have been developed for game play. For example, various gaming companies have created gaming consoles to provide a user with a unique gaming experience. To illustrate, the user can play war games, kungfu games, dancing games, etc.

Some gaming companies have developed a display device that goes over a head of the user and provides the user with a display of a game. The user feels as if he/she is in a game during use of such display device to play the game.

However, with an increase in graphics associated with a game and processing associated with the game, processing power of the gaming consoles cannot be increased.

SUMMARY

Embodiments of the present disclosure provide systems and methods for using a distributed game engine.

Other aspects of the present disclosure will become apparent from the following detailed description, taken in conjunction with the accompanying drawings, illustrating by way of example the principles of embodiments described in the present disclosure.

For gaming and scientific computations, there is always a hunger for an increasing amount of compute power. The compute power of a single server is limited by the computer parts available at time of assembly from chip manufacturers. For a given computer generation, computer chip manufacturers are constrained to a certain number of central processing unit (CPU) or graphical processing unit (GPU) cores per chip due to technical limitations in transistor count and power. These technical barriers are moved up every few years by Moore's Law. However, sometimes, a higher amount of compute power is required instantaneously. One way to obtain more compute power is to use within a single server multiple CPU sockets and add more GPU boards. However, space within the single server becomes limited as more CPU sockets and more GPU boards are added. Another way to obtain more compute power is to use additional servers and spread workload across multiple servers.

In one embodiment, a high-speed, low latency system in which multiple servers optionally composed out of game consoles are interconnected is described. This technology is the building block for an elastic compute architecture, which, for example, is utilized for gaming purposes including cloud gaming. The embodiment allows clustering of compute nodes, e.g., game consoles, virtual machines, servers, etc., to obtain a larger amount of compute capacity otherwise available. The way the compute nodes are tied together allows for ways of writing game engines, where for example a game, either a single-player game or multiplayer game, runs across many compute nodes. The system provides a clustering technology that allows for different types of games.

Given the hardware architecture for elastic compute, various applications are described to leverage the compute capability. One use case is to offer the compute capability of multiple compute nodes to a single user. For example, a game engine spans multiple compute nodes. This could be done in several ways. To illustrate, each compute node renders a different frame, e.g., a node 1 renders a frame 1+n and a node 2 renders a frame 2+n, where n is the number of nodes. Some game engines share frame information from physics and GPU buffers. For example, each node reads the frame information from the other nodes memory when given a notification with memory addresses on data availability or so. To illustrate, a node sends an interrupt to another node and reads the frame information from a shared register within the other node. This is orders of magnitude faster than network packets. As another example of sharing frame information, universal datagram protocol/transmission control protocol (UDP/TCP) network packets are used to read the frame information. As yet another illustration, each compute node renders a portion of a frame, e.g., a quarter or a pre-determined number of lines. As yet another illustration, in a master-slave architecture, one node is master and delegates compute tasks among compute nodes. As another example, a node sends an interrupt to another node and writes the frame information to a shared register within the other node. This can be orders of magnitude faster than network packets. As another example of sharing frame information, UDP/TCP protocol is used to write the frame information. Some tasks utilize more or less time than others, so the master is a scheduler. Some physics calculations are done on the master and states of a game are broadcasted to slaves.

If a single user configuration as described above is used for cloud gaming, there are challenges on how to manage an input received via an input device, e.g., a gamepad, or a keyboard, or a mouse, and how to manage audio and/or video streaming. In cloud gaming, there is a single client, which sends input to many nodes and the client receives audio and/or video from a variety of nodes. One of the nodes is marked as a streaming node, which handles connection with the client and receives input and propagates the input to other nodes. This node also sends all the compressed audio and video data to the client. The node also takes care of audio and video encoding on behalf of all nodes or each node could do that itself. However, for audio and video encoding previous frame data is often used, so the previous frame data is shared among nodes. It is also possible to use multiple video streams, for example, if each node handles a corner of the image and each corner is its own video stream. The client stitches the corners together and renders them synchronized. Some form of blending is used in seams between video frames to avoid ugly edges.

One use for an elastic compute cluster is for new types of multiplayer games. More responsive types of games are played when all users are connected to the same virtual scene hosted within such a cluster. In addition, power savings is achieved in an elastic compute if redundant computations are eliminated. In conventional multiplayer games, when users play in the same world, many physics computations have to be repeated for each user's their (local) instance of the game engine. It is possible to perform computations once, which saves power.

In one aspect, a method for using a distributed game engine is described. The method includes receiving a request from a user account via a computer network to play a game, identifying processing power assignment for the user account, and determining node assembly for the user account to utilize two or more processing nodes for the play of the game based on the processing power assignment. The method further includes initializing the two or more processing nodes for execution of the game for the user account. The operation of initializing is performed to set up a transfer of processing code for the game from one of the two or more processing nodes to another one of the two or more processing nodes. The method includes defining an internal communication channel between the two or more processing nodes for exchange of state information of the game. The exchange of state information is performed to enable shared processing of the game by the two or more nodes. The exchange of state information between the two or more nodes occurs continuously so that the two or more nodes operate as an aggregated node.

In another aspect, a method for processing a distributed game engine is described. The method includes receiving a request to play a game from a client device via a user account and a computer network, assigning a number of server nodes for the play of the game, and sending information to the server nodes to enable the nodes to communicate with each other using a communication protocol to facilitate the play of the game. The method includes distributing a game engine for the play of the game between the server nodes.

In yet another aspect, a system for processing a distributed game engine is described. The system includes a cloud gaming server configured to receive a request to play a game from a client device via a user account and a computer network and a node assembly server coupled to the cloud gaming server. The node assembly server assigns a number of server nodes for the play of the game. The node assembly server sends information to the server nodes to enable the server nodes to communicate with each other using a communication protocol to facilitate the play of the game. One of the server nodes distributes a game engine for the play of the game between the server nodes.

BRIEF DESCRIPTION OF THE DRAWINGS

Various embodiments of the present disclosure are best understood by reference to the following description taken in conjunction with the accompanying drawings in which.

DETAILED DESCRIPTION

Systems and methods for using a distributed game engine are described. It should be noted that various embodiments of the present disclosure are practiced without some or all of these specific details. In other instances, well known process operations have not been described in detail in order not to unnecessarily obscure various embodiments of the present disclosure.

Figure 1:
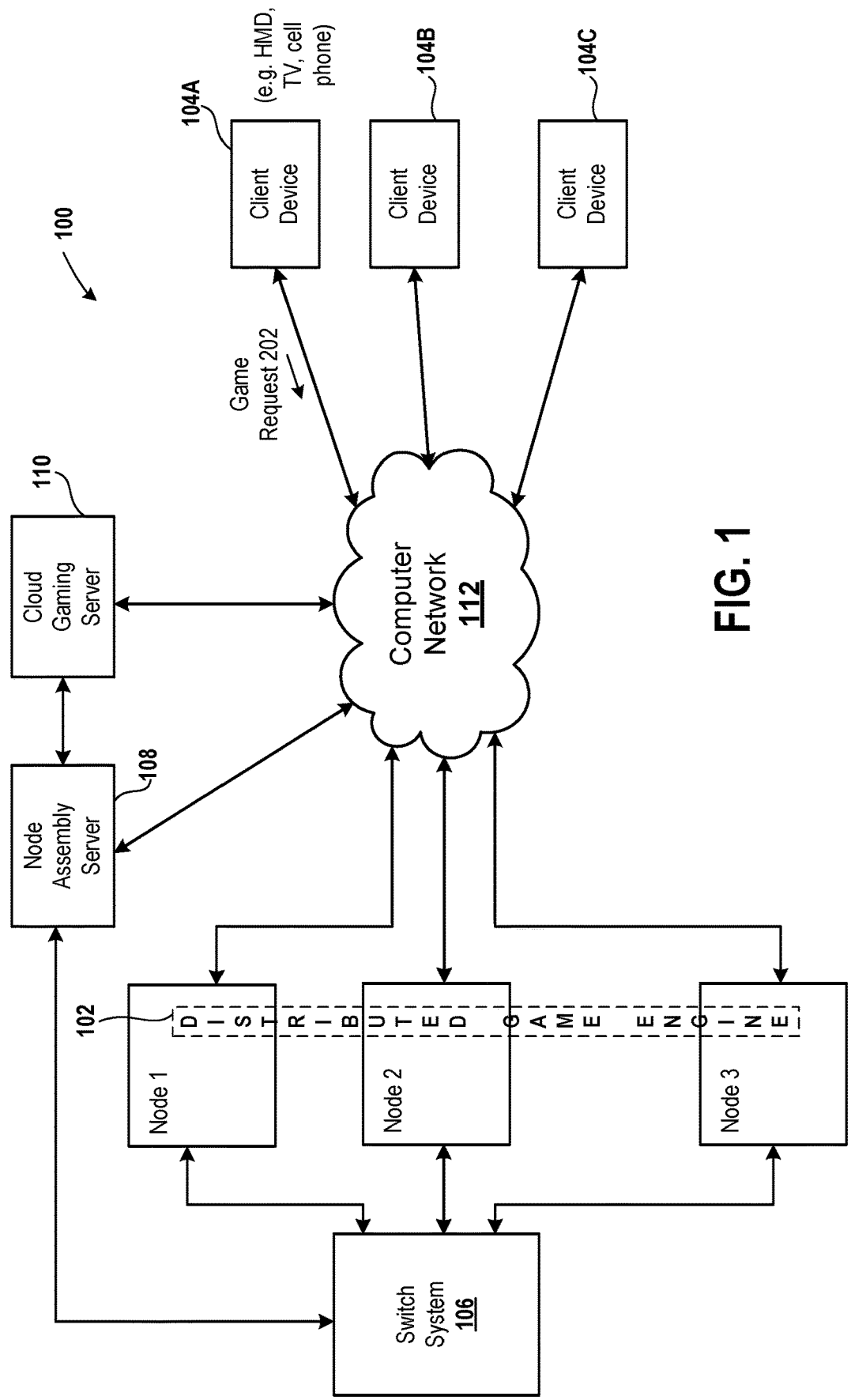
FIG. 1 is diagram of an embodiment of the system describing a distributed game engine.

FIG. 1 is diagram of an embodiment of the system 100 describing a distributed game engine 102. The system 100 includes a plurality of client devices 104A, 104B, and 104C. The system 100 further includes a switch system 106 and a plurality of nodes 1, 2, and 3. The system 100 includes a node assembly server 108 and a cloud gaming server 110.

A client device, as used herein, is a device that is operated by a user to gain access to a game that is executed using the distributed game engine 102. Examples of a client device include a game console, a computer, a smart phone, a smart television, a head-mounted display (HMD), and a pad, etc.

An HMD, as used herein, is a display device that is worn by a user to view a virtual scene, such as a virtual reality (VR) scene or an augmented reality (AR) scene. The VR scene or the AR scene is generated upon execution of the distributed game engine 102.

A node, as used herein, is a hardware server or a game console to execute the distributed game engine 102. As an example, a node has a separate housing than a housing of another node. As another example, a node is placed on a different rack of a data center than a rack on which another node is placed within the data center.

In an embodiment, multiple nodes are located within a single housing. For example, in case of PlayStation Now™ servers, a single housing is shared by multiple nodes. When multiple nodes are housed in the single housing, each node has its own network connectivity to a rack and further to a computer network. However, as an alternative, the single housing includes a network device, such as a switch, and the nodes are coupled via the switch and a single cable to the rack for coupling to a computer network. The single housing having multiple nodes allows for better connectivity in terms of throughput and latency.

In one embodiment, a node is executed using a virtual machine, which is an emulation of the computer system. In the virtual machine, a hypervisor is a computer software or hardware or a combination thereof that shares and manages hardware resources, such as processors and memory devices, to run the distributed game engine 102. As an example, a virtual machine includes an operating system, one or more application computer programs that run on top of the operating system, and one or more hardware resources, e.g., central processing units, graphical processing units, video encoders, audio encoders, network communication devices, memory devices, internal communication devices, network communication devices, etc., that are accessed by the one or more application computer programs via the operating system and the hypervisor for performing the functions described herein as being performed by a node.

A switch system, as used herein, includes one or more switches that facilitate a transfer of data between the node assembly server 108 and one or more of the nodes 1, 2, and 3. For example, a switch system is a switch fabric. The switch fabric has a large amount of bandwidth among nodes and is dynamically reconfigured often and allows for Quality of Service (QoS). To illustrate, the QoS facilitates reducing congestion on links when there is not enough capacity among the nodes and the QoS retries sending data. Some nodes, in time, start processing data received from nodes lacking capacity. As another example, a switch system includes a multiplexer that selects among the nodes 1, 2, and 3 that are to execute the distributed game engine 102 and to which data is transferred from the node assembly server 108 and from which data is transferred via a computer network 112 to one or more of the client devices 104A, 104B and 104C. As another example, a switch system includes one or more transistors that facilitate a transfer of data between the node assembly server 108 and one or more of the nodes 1, 2, and 3. As yet another example, a switch system includes one or more switches, each of which changes its position between an open position and a closed position. The open position of a switch decouples the node assembly server 108 from a node that is coupled to the switch. The closed position of the switch couples the node assembly server 108 to a node that is coupled to the switch.

A computer network, as used herein, is used to transfer data between a client device and a server, or between a client device and the node, or between multiple client devices, etc., to facilitate an operation of the distributed game engine 102. Examples of the computer network include a wide area network (WAN) such as Internet, or a local area network (LAM) such as the Internet, or a combination thereof.

The distributed game engine 102 includes a game code, e.g., a game computer program, a computer program for generating a VR scene, a computer program for generating an AR scene, etc., and other codes, e.g., a physics code, a rendering code, etc., which are further described below for generating the VR scene or the AR scene. As an example, a portion of the distributed game engine 102 is stored and executed by the node 1, another portion of the distributed game engine 102 is stored and executed by the node 2, and the remaining portion of the distributed game engine 102 is stored and executed by the node 3.

The client device 104A generates and sends a game request 202 via the computer network 112 to the cloud gaming server 110. The cloud gaming server 110 determines based on the game request 202 whether a user account that is accessed by a user 1 of the client device 104A to generate the game request 202 is authorized to access the distributed game engine 102. The user 1 of the client device 104A provides login information, e.g., user name, password, etc., via an input device, e.g., hand-held controller, a camera, etc., of the client device 104A or an external camera to access the user account. When the login information is authenticated by the cloud gaming server 110, the user 1 of the client device 104A is provided access to the user account. Upon determining that the user account is authorized to access the distributed game engine 102, the cloud gaming server 110 sends a signal to the node assembly server 108 for enabling execution of the distributed game engine 102.

In one embodiment, in addition to the authentication of the login information, there are additional operations that are performed before enabling the client device 104A to couple to the node assembly server 108 for execution of the distributed game engine 102. For example, a network test server coupled to the computer network 112 receives the signal from the cloud gaming server 110 for enabling execution of the distributed game engine 102 and executes a bandwidth ping to multiple data centers. Results of the test are provided to a cloud resource manager server by the network test server. The cloud resource manager is coupled to the computer network 112. The cloud resource manager 112 determines which of the data centers the client device 104A would connect to. This determination is based on the test results and other information, such as, availability of sufficient number of nodes and in which of the data centers the game is stored. The cloud assembly selects the data center having the nodes 1, 2, and 3, and sends a signal to the node assembly server 108 to select one or more of the nodes 1 2, and 3.

The node assembly server 108 upon receiving the signal from the cloud gaming server 110 or the cloud assembly server selects, via the switch system 106, one or more of the nodes 1, 2, and 3 that will execute the distributed game engine 102 to initialize the one or more of the nodes 1, 2, and 3. For example, the node assembly server 108 sends a signal to a control input of the switch system 106 to couple to the nodes 1 and 2. Upon receiving the signal at the control input, the switch system 106 closes positions of two of the switches to connect the node assembly server 108 to the nodes 1 and 2, and opens a position of one of its switches to disconnect the node assembly server 108 from the node 3. The distributed game engine 102 is executed to transfer data, such as encoded frames, from one or more of the nodes 1, 2, and 3 via the computer network 112 to one or more of the client devices 104A, 104B, and 104C.

It should be noted that the system 100 includes a number of nodes other than that illustrated in FIG. 1. For example, the system 100 includes 50 nodes, or 25 nodes, or 5 nodes, among which the game engine 102 is distributed.

Figure 2:
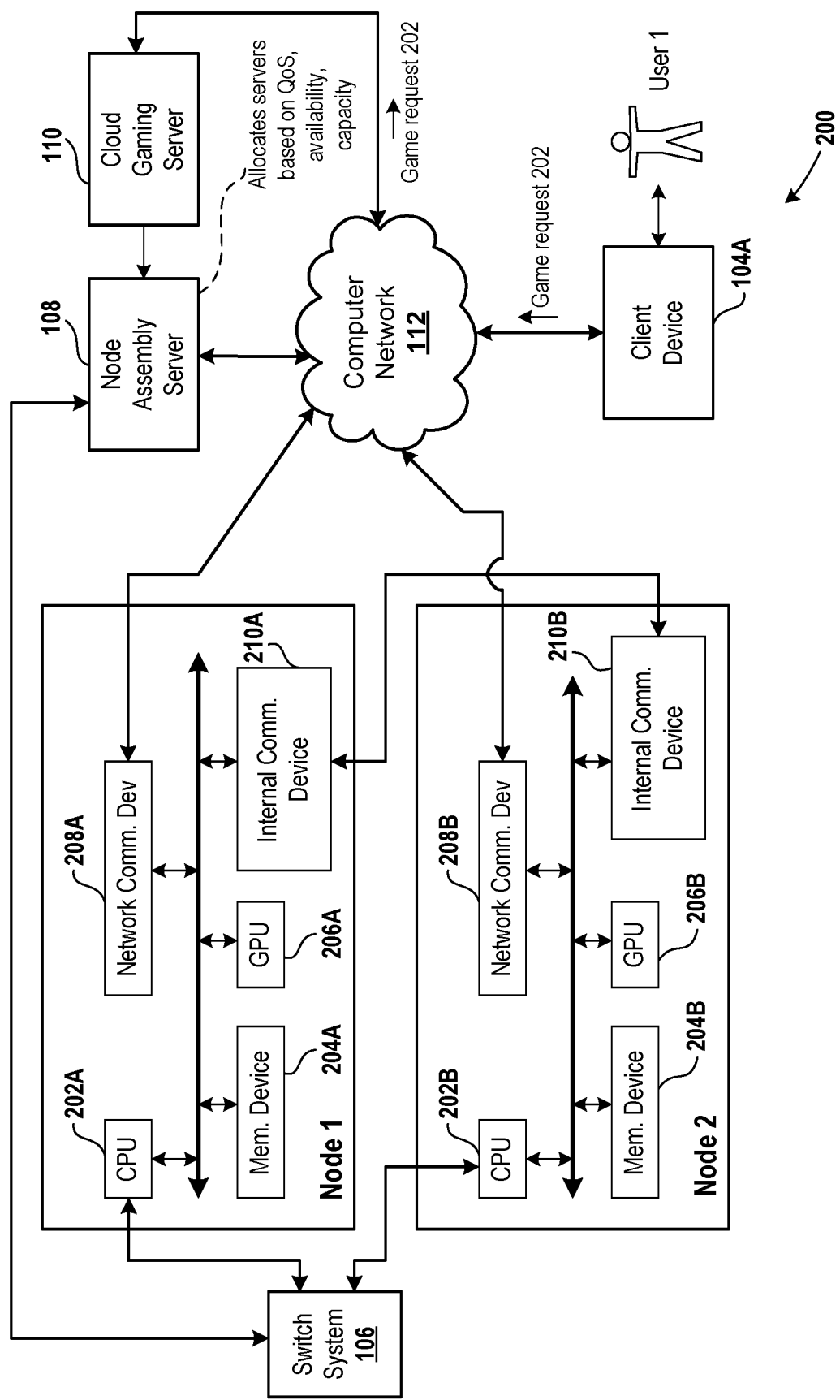
FIG. 2 is a diagram of an embodiment of a system to illustrate details about a node.

FIG. 2 is a diagram of an embodiment of a system 200 to illustrate details about a node. The node 1 includes a central processing unit (CPU) 202A, a memory device 204A, a graphical processing unit (GPU) 206A, a network communication device 208A, and an internal communication device 210A. Similarly, the node 2 includes a CPU 202B, a memory device 204B, a GPU 206B, a network communication device 208B, and an internal communication device 210B.

A CPU, as used herein, of a node is used to process, e.g., analyze, examine, etc., data that is received from the node assembly server 108 or from one or more of the client devices 104A through 104C, and stored within a memory system that is coupled to the CPU. Examples of the CPU include a processor, an application specific integrated circuit (ASIC), and a programmable logic device (PLD).

A memory device is a device from which data is read or to which the data is written. Examples of a memory device include a read-only memory (ROM) device, or a random access memory (RAM) device, or a combination thereof. To illustrate, a memory device includes a flash memory or a redundant array of independent disks (RAID).

A GPU, as used herein, executes a rendering computer program to generate a video frame, which includes texture and lighting information of an AR scene or a VR scene. Examples of the GPU include a processor, an ASIC, and a PLD. In one embodiment, the terms "video frame" and "image frame" are used interchangeably herein.

An internal communication device is used to communicate data between one node and another node. The internal communication device applies an internal communication protocol, e.g., a direct memory access (DMA) protocol, a remote DMA (RDMA) protocol, RDMA over converged Ethernet, Infiniband, an Ethernet protocol, a customized protocol, a serial transfer protocol, a parallel transfer protocol, a universal serial bus (USB) protocol, a wireless protocol, a Bluetooth protocol, a wired protocol, a universal datagram protocol (UDP), a UDP over Internet protocol, Transmission Control Protocol (TCP) over IP protocol, Ethernet over TCP/IP, etc., to communicate the data between two nodes. As an example of DMA, an internal communication chip, such as a PCI Express non-transparent switch chip, an RDMA chip, or an RDMA over converged Ethernet chip, or an Infiniband chip, of a node communicates via a peripheral component interconnect-express (PCIe) communication bus to directly write to a memory device in one or more other nodes or read from the memory device. Moreover, in communication busses like PCIe, peripherals such as GPUs and other devices are memory based as each peripheral has an assigned memory address space on the bus. To illustrate, a GPU of one node applies the internal communication protocol to write to or read from a register or a buffer of a GPU of another node. In this manner, a node communicates with another node through shared mailbox registers. There is an interruption in applications running on a CPU of a node when another node reads to or writes from the node. The other node sends an interrupt signal before reading to or writing from the node.

Examples of the internal communication device include a processor, an ASIC, and a PLD. To illustrate, the internal communication device is a PCI Express non-transparent switch chip or an RDMA chip, or an RDMA over converged Ethernet chip, or an Infiniband chip. As another illustration, the internal communication device is a network interface controller or a network interface card (NIC), a device that communicates using a serial transfer of data, a device that communicates using a parallel transfer of data, or a device that communicates using a universal serial bus (USB) protocol.

It should be noted that PCI-Express and RDMA technology has significantly lower latency and offers higher performance compared to the Ethernet protocol or TCP protocol or UDP protocol, because it eliminates protocol layers which occur overhead in operating systems, which are executed by a CPU. An application, such as a DMA engine executing the DMA protocol, executed within a node directly reads from or writes to memory in other nodes bypassing the operating system within the node when the node has been granted access to blocks of data within the other nodes. There is no network protocol, such as the Ethernet protocol or TCP protocol or UDP protocol, and the application of the node decides how it organizes memory and its internal structure. The internal communication chip of a node has the DMA engine and if memory transfer operation between the node and other nodes are called for, the internal communication chip executes the DMA engine to read and write data from the other nodes without involving a CPU of the node. It should be noted that in one embodiment, the internal communication chip is used in conjunction with a switch fabric coupling multiple nodes, a single rack or even multiple racks.

A network communication device is used to transfer data packets between a node and a client device via the computer network 112. For example, the network communication device applies an external communication protocol, e.g., TCP/IP, UDP/IP, etc., to receive and send data packets. Examples of a network communication device include a processor, an ASIC, and a PLD. To illustrate, the network communication device is a network interface controller or a NIC.

The CPU 202A, the memory device 204A, the GPU 206A, the network communication device 208A, and the internal communication device 210A are coupled to each other, e.g., via a bus. Similarly, the CPU 202B, the memory device 204B, the GPU 206B, the network communication device 208B, and the internal communication device 210B are coupled to each other.

The node assembly server 108 allocates two or more of the nodes 1, 2, and 3 based on criteria, such as, quality of service (QoS) between the nodes and a client, availability of the nodes, capacity of the nodes for transferring data to the client and receiving data from the client, bandwidth capacity of the computer network 112 between the nodes and the client, a subscription level assigned to a user account, or a combination thereof.

In an embodiment, instead of one memory device, multiple memory devices are used within the node to store data that is stored within the memory device. In one embodiment, instead of one CPU, multiple CPUs are used within the node to perform functions that are performed by the CPU. In an embodiment, instead of one GPU, multiple GPUs are used within the node to perform functions that are performed by the GPU.

Figure 3A:
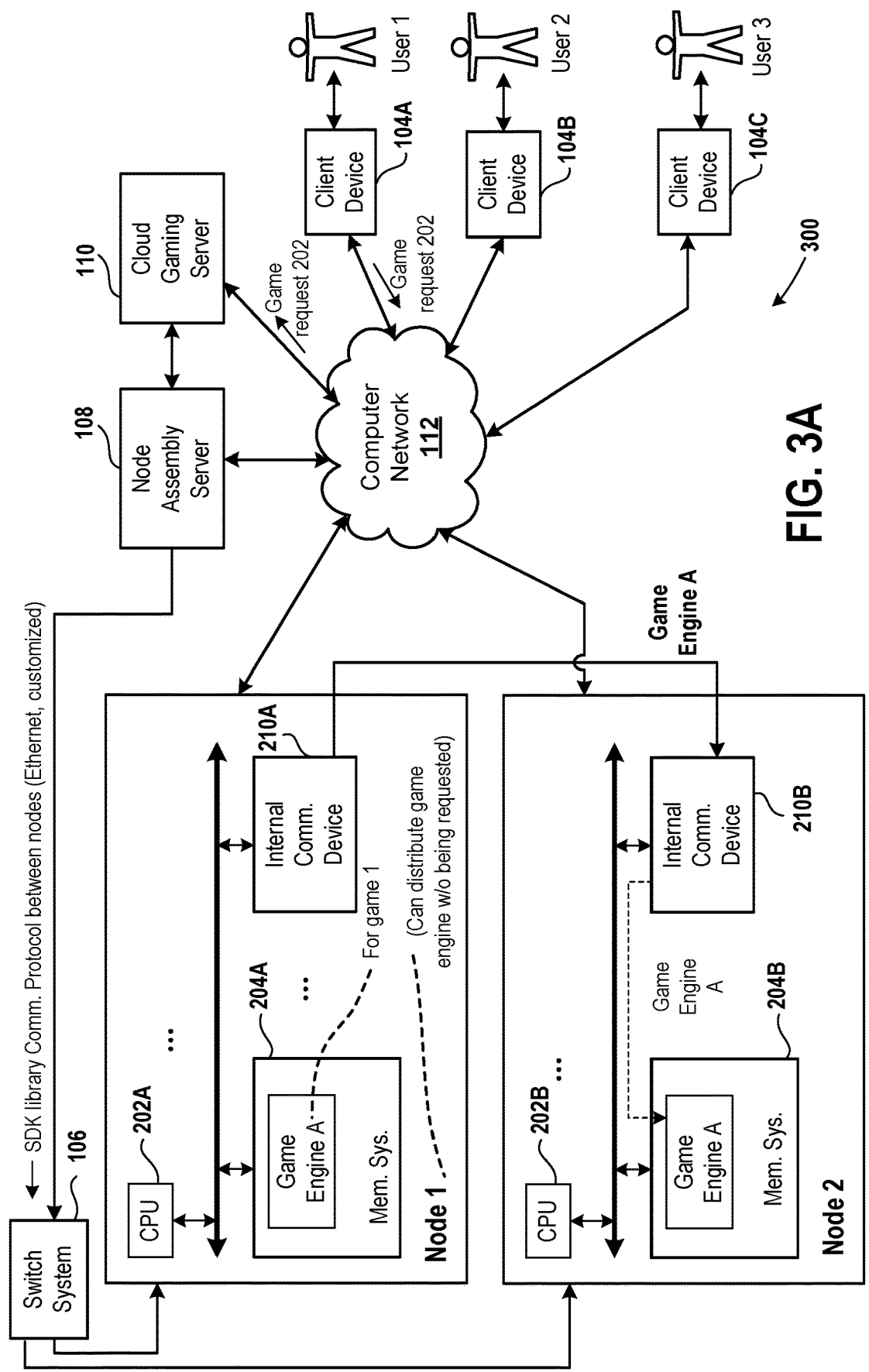
FIG. 3A is a diagram of an embodiment of a system to illustrate a distribution of the game engine between multiple nodes.

FIG. 3A is a diagram of an embodiment of a system 300 to illustrate a distribution of the game engine 102 between the nodes 1 and 2. The node assembly server 108 determines to select the nodes 1 and 2 for distribution of the game engine. Upon determining to select the nodes 1 and 2, the node assembly server 108 sends a control signal to the switch system 106 to couple the node assembly server 108 to the CPU 202A of the node 1 and to the CPU 202B of the node 2. In one embodiment, the cloud resource manager, instead of the node assembly server 108, determines to select the nodes 1 and 2 for distribution of the game engine and sends a control signal to the switch system 106 to couple the node assembly server 108 to the CPU 202A of the node 1 and to the CPU 202B of the node 2. In one embodiment, the functions described herein as being performed by the node assembly server 108 are performed by the cloud resource manager. In an embodiment, the cloud resource manager delegates its functions to the node assembly server 108 to perform.

Moreover, the node assembly server 108 sends information identifying the internal communication protocol to be used to communicate data between the internal communication device 210A and the internal communication device 210B. For example, the node assembly server 108 sends a software development kit (SDK) via the switch system 106 to the internal communication device 210A and the internal communication device 210B. The SDK is used by a programmer user to program an internal communication device to communicate with another internal communication device using the internal communication protocol. As another example, the node assembly server 108 sends the internal communication protocol via the switch system 106 to the internal communication device 210A and the internal communication device 210B. The internal communication devices 210A and 210B apply the internal communication protocol to communicate with each other.

Moreover, the node assembly server 108 determines from a signal identifying a game to be executed which of the nodes 1 and 2 has the game engine for executing the game to generate a VR scene or an AR scene. The signal identifying the game is received from the cloud gaming server 110. For example, the node assembly server 108 identifies from the signal identifying the game that a game engine A is stored within the node 1. In one embodiment, the node assembly server 108 sends a request signal to the nodes 1 and 2 via the switch system 106 to determine which of the nodes 1 and 2 has the game engine A.

In one embodiment in which it is determined that any of the nodes do not have the game engine A, the node assembly server 108 sends a signal to a storage server that is coupled to the computer network 112 identifying the game for receiving the game engine A. The game engine A is stored in the storage server. The node assembly server 108 communicates with the storage server to send the game engine A to the nodes 1 and/or 2.

When the node 1 has the game engine A, the node assembly server 108 sends a command signal to the CPU 202A via the switch system 106 to distribute the game engine A from the memory device 204A to the node 2. For example, the node assembly server 108 sends the command signal to the CPU 202A to transfer a copy of the game engine A to the node 2.

Upon receiving the command signal, the CPU 202A accesses the game engine A from the memory device 204A and sends the game engine A to the internal communication device 210A. The internal communication device 210 A applies the internal communication protocol to the game engine A to generate transfer units, e.g., frames, packets, etc., and sends the transfer units to the internal communication device 210B. The internal communication device 210 B applies the internal communication protocol to the transfer units that are received to extract the game engine A, and sends the game engine A to the memory device 204B for storage.

In one embodiment, the CPU 202A has none or a very limited role in transferring the game engine A from the node 1 to the node 2. For example, the internal communication device 210B of node 2, after obtaining a memory location of the game engine A from the internal communication device 210A of node 1, copies the game engine A from the memory device 204A of node 1 to the memory device 204B of node 2. A location of the game engine A within the memory device 204A was reported earlier by the CPU 202A or by the internal communication device 210A to the internal communication device 210B of node 2. For example, the location of the game engine A within the memory device 204A was reported earlier by the CPU 202A or by the internal communication device 210A to the node assembly server 108. As another example, the location of the game engine A within the memory device 204A was reported earlier by the CPU 202A or the internal communication device 210A to the internal communication device 210B of node 2.

Figure 3B:
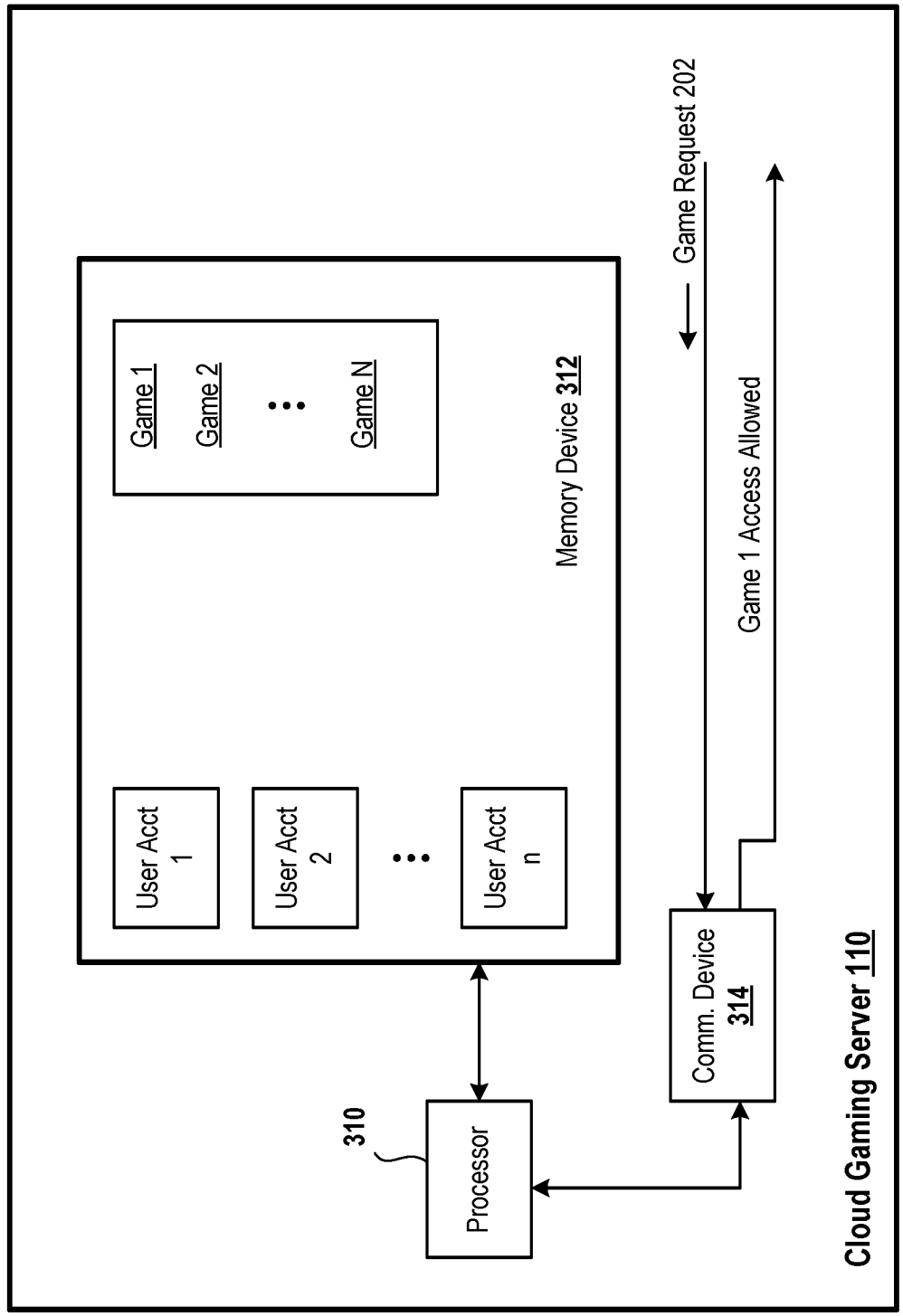
FIG. 3B is a diagram of an embodiment of a cloud gaming server.

FIG. 3B is a diagram of an embodiment of the cloud gaming server 110.

The cloud gaming server 110 includes a processor 310, a memory device 312, and a communication device 314. Examples of a processor include a CPU, an ASIC, and a PLD. Examples of the communication device 314 include a network interface controller, a NIC, a device that communicates using a serial transfer of data, a device that communicates using a parallel transfer of data, and a device that communicates using the USB protocol. To illustrate, the communication device 314 applies a network communication protocol, such as TCP/IP.

The memory device 312 stores identifiers of multiple user accounts 1 through n, where n is an integer greater than 1. For example, the memory device 310 stores a user identifier (ID) 1 of the user account 1 and a user ID 2 of the user account 2. A user ID includes one or more alphanumeric characters, or symbols, or a combination thereof, and is assigned to a user account by the processor 310. Examples of a user ID include a username, a password, or a combination thereof. A user ID is unique in that the user ID that is assigned to a user account by the processor 310 is not assigned to any other user account by the processor 310. The processor 310 determines whether a user ID that is received from a user via a client device and the computer network 112 is assigned to any other user account. Upon determining that the user ID is assigned to the other user account, the processor 310 indicates to the user via the client device to provide another user ID.

The memory device 312 further stores a plurality of game titles of games 1 through N, where N is an integer greater than 1. Each game title identifies a different game. For example, game title includes a description that describes a game and the description is different from a description of another game. Each game is executed using a different game engine. For example, the game 1 is executed by running the distributed game engine 102 and the game 2 is executed by running another distributed game engine.

The communication device 314 receives the game request 202 from the client device 104A, illustrated in FIG. 2, and sends the game request to the processor 310. The game request 202 includes a request for playing the game 1. The game request 202 is received via the user account 1 after the user 1 logs into the user account 1 via the client device 104A. The user 1 logs into the user account 1 by providing the user ID1 via the client device 104A. The user ID1 is communicated from the client device 104A via the computer network 112 and the communication device 314 to the processor 310. The processor 310 determines whether the user ID1 is authentic, e.g., matches a user ID stored in the memory device 312, and upon determining so, the processor 310 allows the client device 104A to log into the user account 1.

Upon receiving the game request 202, the processor 310 determines whether the user account 1 is authorized to access the game 1. The authorization is stored in the memory device 312 and is provided based on various factors, such as, games purchased via the user account 1, a demographic of the user 1 stored within the user account 1, a number of game points earned by the user 1 via the user account 1, etc. Upon determining that the user account is authorized to access the game 1, the processor 310 sends an instruction via the communication device 314 to the node assembly server 108, illustrated in FIG. 2, that the user account 1 is allowed access to play the game 1.

In one embodiment, functions described herein as being performed by the processor 310 are instead performed by multiple processors. In an embodiment, data stored within the memory device 312 is instead stored within multiple memory devices.

Figure 3C:
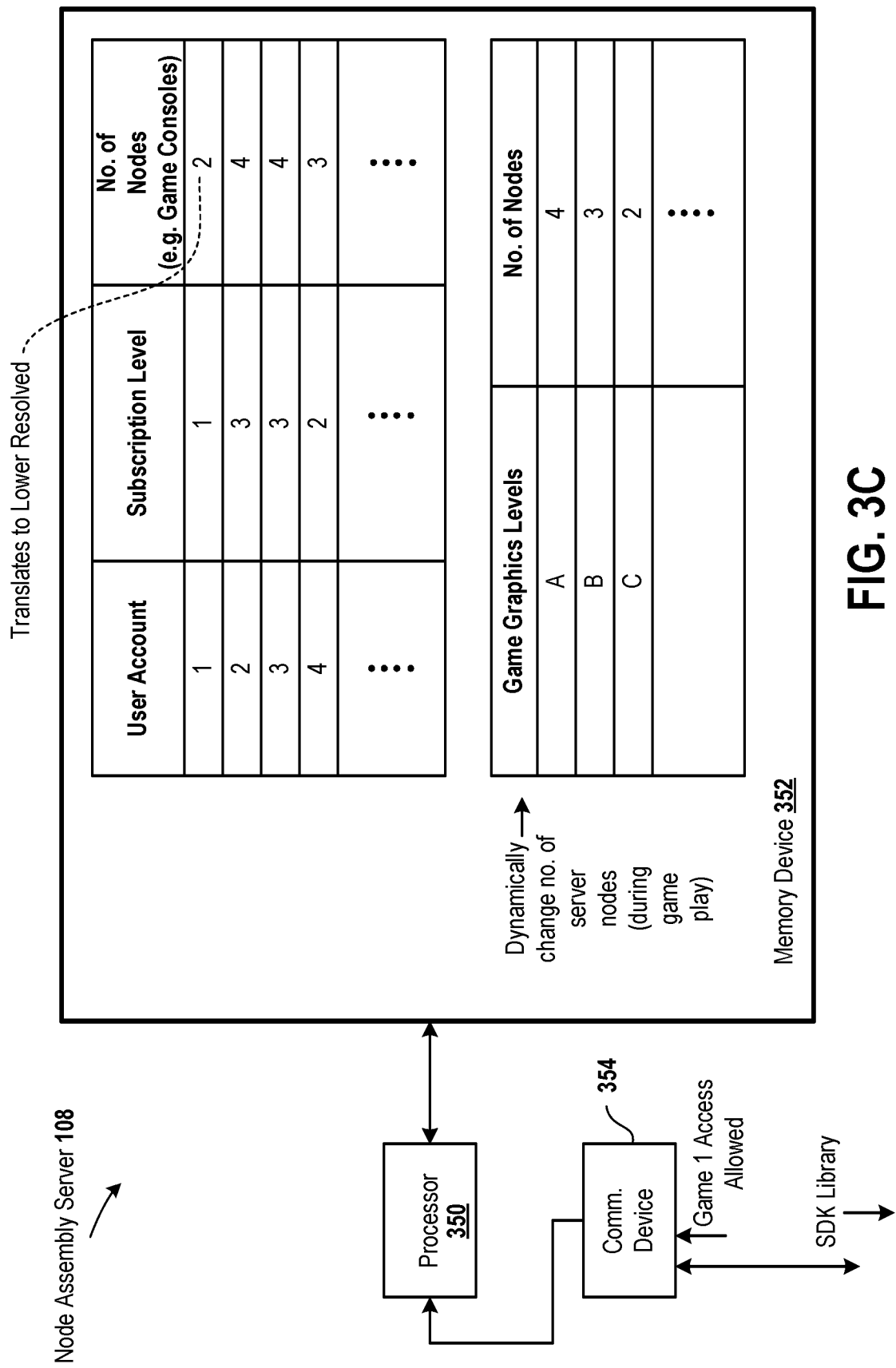
FIG. 3C is a diagram of an embodiment of a node assembly server.

FIG. 3C is a diagram of an embodiment of the node assembly server 108. The node assembly server 108 includes a processor 350, a memory device 352, and a communication device 354. Examples of the communication device 354 include a network interface controller, a NIC, a device that communicates using a serial transfer of data, a device that communicates using a parallel transfer of data, and a device that communicates using the USB protocol.

The memory device 352 stores a correspondence, e.g., a mapping, a listing, a one-to-one relationship, etc., between the user accounts 1 through n, multiple subscription levels 1, 2, and 3, and a number of nodes. For example, the memory device 352 has an entry that the user account 1 is assigned a subscription level 1 and the subscription level 1 is defined to enable use of two nodes for playing a game that is requested for access via the user account 1. As another example, the memory device 352 has another entry that the user account 2 is assigned a subscription level 3 and the subscription level 3 is defined to enable use of four nodes for playing a game that is requested for access via the user account 2.

The greater the number of nodes, the higher the processing power, e.g., a number of GPUs and CPUs, used to execute the distributed game engine 102. For example, the subscription level 3 corresponds to use of 4 nodes to execute the distributed game engine 102 and the subscription level 1 corresponds to use of 2 nodes to execute the distributed game engine 102. When each node has one GPU and one CPU, the subscription level 3 corresponds to 4 nodes, e.g., 4 GPUs and 4 CPUs, and the subscription level 1 corresponds to 2 nodes, e.g., 2 GPUs and 2 CPUs. The subscription level 3 assigns the greater processing power compared to the subscription level 1.

A subscription level is assigned to a user account based on a type of the user account. For example, when the user account is used to play one or more games in a regular fashion, e.g., periodically, weekly, daily, etc., the user account is assigned a higher subscription level than a user account that is used to play the one or more games in an irregular fashion. As another example, when a first user account is used to play one or more games and purchases a higher number of virtual items in the one or more games than that purchased in a second user account, the first user account is assigned the higher subscription level than the second user account. As yet another example, both the play of the one or more games in the regular fashion and the purchase of the higher number of virtual items are monitored to determine to assign the higher subscription level.

The memory device 352 further stores a correspondence, e.g., a mapping, a listing, a one-to-one relationship, etc., between a graphics level of a game and a number of nodes executing a distributed game engine for allowing play of the game. For example, the memory device 352 includes an entry indicating that when a graphics level for the game is A, a number of nodes executing the distributed game engine for playing the game is 4. As another example, the memory device 352 includes an entry indicating that when a graphics level for the game is B, a number of nodes executing a distributed game engine for playing the game is 3. As yet another example, the memory device 352 includes an entry indicating that when a graphics level for the game is C, a number of nodes executing a distributed game engine for playing the game is 2.

A graphics level is defined based on criteria, such as, a resolution of an image of a game, a number of colors used to generate frames of the game, a number of intensity levels used to generate the frames, a frame rate for playing the game, a number of virtual items whose positions change in the game, an amount of background that stays stationary within the game, or a combination thereof. As an example, there is an increase in a number of nodes are used to execute a distributed game engine when there is an increase in a frame rate, or an increase in a resolution, or an increase in a number of intensity levels, or an increase in a number of virtual items, or an increase in the number of colors used in frames for playing a game. To illustrate, in case of a handover of streaming sessions between devices, there is an increase in the number of nodes. To illustrate further, a user is playing the game on his/her smartphone or tablet. When the user reaches his/her home, the user wishes to transfer the game to his/her PlayStation™ game console. The smartphone or tablet displays the game in a low resolution and a low frame rate but the PlayStation™ game console in conjunction with a 4K or an 8K television applies a higher resolution and a higher frame rate. To support the higher resolution and the higher frame rate, there is an increase in the number of nodes. Such a handover is described in U.S. patent application Ser. No. 15/141,799, filed on Apr. 28, 2016, and titled "Cloud Gaming Device Handover" which is incorporated by reference herein in its entirety. As another example, there is a decrease in a number of nodes used to execute a distributed game engine when there is a decrease in a frame rate, or a decrease in a resolution, or a decrease in a number of intensity levels, or a decrease in a number of virtual items, or a decrease in the number of colors used in frames for playing a game.

The communication device 354 receives the instruction that access to the game 1 is allowed from the communication device 314 of the cloud gaming server 110, and sends the instruction to the processor 350. The instruction includes the user ID1 that is assigned to the user account 1. The processor 350 accesses the memory device 352 to determine based on the user ID1, a corresponding subscription level that is assigned to the user account 1. For example, the processor 350 determines that the user account 1 is assigned the subscription level 1 and that two nodes are to be assigned to the user account 1 to execute the distributed game engine 102.

The processor 350 sends via the communication device 354 information, e.g., a library that includes the SDK, to the nodes 1 or via the switch system 106 to enable the nodes 1 and 2 to communicate with each other using the internal communication protocol to facilitate a play of the game 1. In an embodiment, the processor 350 sends via the communication device 354 the information to both the nodes 1 and 2 via the computer network 112 to enable the nodes 1 and 2 to communicate with each other using the internal communication protocol to facilitate a play of the game 1.

In one embodiment, the different graphics levels are for playing different games. For example, the graphics level C is for playing the game 1 and the graphics level B is for playing the game 2.

Figure 3D:
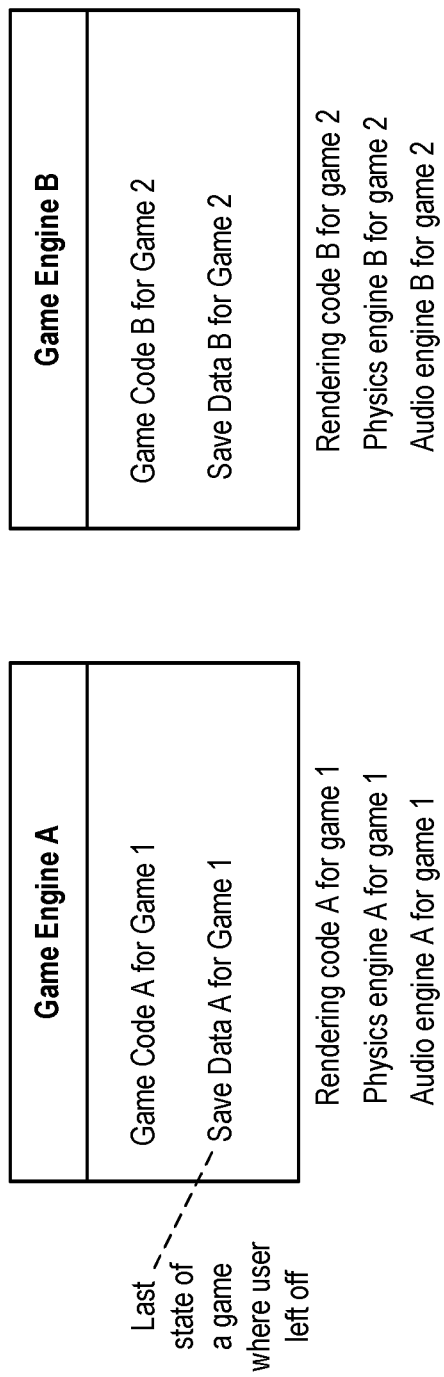
FIG. 3D is a diagram to illustrate various portions of a game engine.

FIG. 3D is a diagram to illustrate various portions of a game engine. The game engine A includes a game code A for playing the game 1, save data A for restoring a state of the game 1, a rendering code A for displaying the game 1, a physical engine A for performing physics operations to execute the game 1, and an audio engine A that applies audio data for playing the game 1. Similarly, the game engine B includes a game code B for playing the game 2, save data B for restoring a state of the game 2, a rendering code B for displaying the game 2, a physical engine B for performing physics operations to execute the game 2, and an audio engine B that applies audio data for playing the game 2.

A game code, as used herein, is a computer program that is executed to determine a next state in a game based on a user input received from a client device via the computer network 112. The user input is a selection made by the user on a hand-held controller or is audio data that is captured by a microphone of a client device, or is image data that is captured by a camera, e.g., a depth camera, an infrared camera, a digital camera, etc., located in a real-world environment, e.g., a room, a warehouse, a floor, a location, a park, etc., in which the user is located, or a combination thereof. The camera captures a gesture, e.g., one or more hand motions, one or more head motions, one or more leg movements, etc., made by a user to generate the image data. A state of a game defines characteristics, e.g., positions, orientations, sizes, shapes, and orientations, etc., of all portions of a virtual scene generated upon execution of the game. The portions of a virtual scene include a virtual object or a background. As an example, a virtual object moves from one video frame to another and the background remains stationary from one video frame to another. As another example, a virtual object moves from one video scene to another and the background remains stationary from one video scene to another. As an example, a virtual object moves from one video frame to another, and the background remains stationary from one video frame to another but moves after a pre-determined number of video frames. Examples of a virtual object include a vehicle, a building, an avatar of the user, a character, a supernatural hero, a weapon, and an animal, etc. Examples of a background include a desert, mountains, ocean, trees, buildings, cities, audience of people, etc.

Save data, as used herein, is state data of a game that is accessed when a user logs into his/her user account after logging out from the user account. For example, during a game session, a user logs out of his/her user account at a game state. When the user logs back into the user account, a client device displays the game state, e.g., same virtual reality scene, etc., that was displayed when the user logged out of the user account.

A rendering code, as used herein, is a computer program that is used to generate an image from a two-dimensional (2D) or a three-dimensional (3D) model of one or more portions of a virtual scene. For example, the rendering code defines texturing and light intensities that are applied to one or more portions of a virtual scene. As another example, the rendering code defines colors, texturing, shading, and light intensities that apply to one or more portions of a virtual scene.

A physics engine, as used herein, is a computer program that is executed to determine physical relationships between different portions in a virtual scene, e.g., a virtual reality scene, an augmented reality scene, etc., and between different virtual scenes. The physical relationships are determined based on laws of physics, such as, gravitational laws, motion laws, friction laws, etc.

An audio engine, is used herein, is a computer program that determines and provides audio data to manage a corresponding virtual scene of a game. For example, when a portion of a virtual scene makes a sound, the audio engine determines audio data for outputting the sound and other variables of the sound, e.g., pitch, tone, amplitude, etc., and links the audio data with the portion of the virtual scene.

Figure 4A:
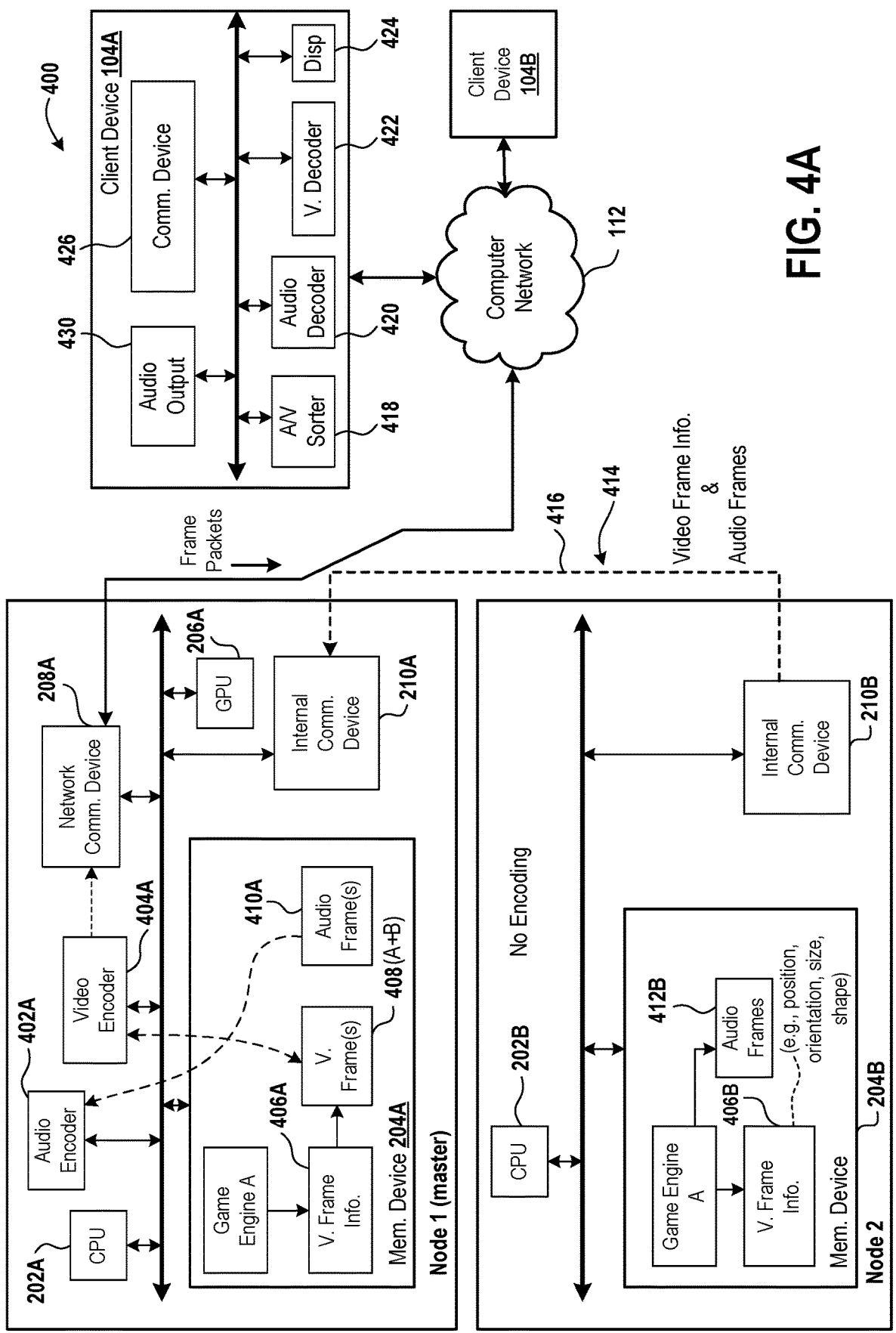
FIG. 4A is a diagram of an embodiment of a system to illustrate execution of the distributed game engine.

FIG. 4A is a diagram of an embodiment of a system 400 to illustrate execution of the distributed game engine 102 of FIG. 1 in which video frame information is sent from the node 2 to the node 1. The system 400 includes the nodes 1 and 2, the computer network 112, and the client devices 104A and 104B. The node 1 includes an audio encoder 402A and a video encoder 404A. However, the node 2 does not include an audio encoder, does not include a video encoder, and does not include a GPU.

An audio encoder, as used herein, is a hardware device, e.g., an integrated circuit, a processor, etc., or a software module, e.g., a computer program, etc., or a combination thereof, that is compresses or decompresses audio data according to an audio file format or a streaming audio format.

A video encoder, as used herein, is a hardware device, e.g., an integrated circuit, a processor, etc., or a software module, e.g., a computer program, etc., or a combination thereof, that is compresses or decompresses video data according to a video file format or a streaming video format, e.g., H.264, H.265/MPEG-H, H.263/MPEG-4, H.262/MPEG-2a, customized protocol, etc.

The client device 104A includes an audio/video (A/V) sorter 418, an audio decoder 420, a video decoder 422, a display device 424, a communication device 426, and an audio output device 430. An A/V sorter is a hardware device, e.g., an integrated circuit, a processor, etc., or a software module, e.g., a computer program, etc., that distinguishes audio data from video data. Moreover, an audio decoder decodes, e.g., decompresses, encoded audio frames according to an audio file format or a streaming audio format to output audio frames. The audio decoder also encodes audio frames. Similarly, a video decoder decodes, e.g., decompresses, encoded video frames according to a video file format or a streaming video format to output video frames. Moreover, the video decoder encodes video frames. Examples of the display device include a head-mounted display (HMD), or a liquid crystal display (LCD) device, or a light emitting diode (LED) display device, or a display screen of a television, or a monitor, or a display screen of a tablet, or a display screen of a smart phone. Examples of a communication device include a network interface controller or a NIC. An example of an audio output includes a digital-to-analog converter that converts digital audio data to analog audio data, and an amplifier, and one or more speakers. An input of the amplifier is coupled to the digital-to-analog converter and an output of the amplifier is coupled to the one or more speakers.

The CPU 202A executes the game engine A to generate video frame information 406A. For example, the CPU 202A executes the game code A and the CPU 202A and/or the GPU 206A execute the physics engine A to generate positions, sizes, shapes, and orientations of one or more virtual scenes of the game 1. Examples of video frame information, as used herein, include a position, a size, a shape, an orientation, or a combination thereof, of one or more virtual scenes.

Similarly, the CPU 202B executes the game engine A to generate video frame information 406B. For example, the CPU 202B executes the game code A and the physics engine A to generate positions, sizes, shapes, and orientations of one or more virtual scenes of the game 1. Moreover, audio frames 412B are generated by one or more processors, e.g., the CPU 202B, of the node 2. The audio frames 412B include audio data that is associated with the video frame information 406B in that the audio data is for emission of sound simultaneous with display of one or more virtual scenes having the video frame information 406B.

The internal communication device 210B of the node 2 applies the internal communication protocol to the video frame information 406B and the audio frames 412B to generate packaged information 414, e.g., packets, transfer units, etc., and sends the packaged information 414 via a communication link 416, e.g., a cable that allows that transfers data packaged in the internal communication protocol, to the internal communication device 210A. An illustration of the link 416 is a PCIe communication bus.

The internal communication device 210A receives the packaged information 414 and applies the internal communication protocol to the packaged information 414, e.g., depacketizes the transfer units, to extract the video frame information 406B and the audio frames 412B from the packaged information 414. The video frame information 406B and the audio frames 412B are stored in the memory device 204A.

The GPU 206A accesses the video frame information 406A and the video frame information 406B from the memory device 204A and applies the rendering code A to the video frame information 406A and the video frame information 406B to generate a plurality of video frames 408 (A+B), which includes video frames 408A generated from the video information 406A and includes video frames 408B generated from the video information 406B. As an example, a video frame includes lighting, intensity, color, texture, shading, or a combination thereof, of one or more virtual scenes.

Moreover, a plurality of audio frames 410A are generated by one or more processors, e.g., the CPU 202A, etc., of the node 1. The audio frames 410A are associated with the video frames 408A in that the audio frames provide audio data for a portion of the scene within the video frames 408A. For example, the audio frames 410A include audio data for a sound to be emitted by a virtual object. As another example, the audio frames 410A include audio data to generate a sound to be emitted by a background within one or more virtual scenes.

The audio encoder 402A encodes the audio frames 410A and the audio frames 412B to generate encoded audio frames. Similarly the video encoder 404A encodes the video frames 408(A+B) to generate encoded video frames. The network communication device 208A applies the external communication protocol to the encoded audio frames and the video encoded video frames to generate a plurality of frame packets and sends the frame packets via the computer network 112 to the client device 104A.

The communication device 426 receives the frame packets and depacketizes the frame packets by applying the external communication protocol to output the encoded video frames and the encoded audio frames. The A/V sorter 418 distinguishes between the encoded video frames and the encoded audio frames, and sends the encoded video frames to the video decoder 422 and the encoded audio frames to the audio decoder 420. The video decoder 422 decodes the encoded video frames to output the video frames 408(A+B). Moreover, the audio decoder 420 decodes the encoded audio frames to output the audio frames 410A and 412B.

The display device 424 displays one or more virtual scenes from the video frames 408(A+B). For example, the display device 424 controls color elements and light intensity elements of the display device 424 to generate a virtual scene that includes the positions, orientations, colors, textures, light intensities, shading, or a combination thereof, of all portions of the virtual scene. Moreover, the audio output device 430 outputs sounds from the audio frames 410A and 412B. For example, the analog-to-digital converter of the audit output 430 converts the audio frames 410A and 412B from a digital format into an analog format to generate analog audio data. The analog audio data is amplified by the amplifier of the audio output device 430 to generate amplified audio data. The amplified audio data is converted from electrical energy to sound energy by the one or more speakers of the audio output device 430.

In an embodiment, the node 1 acts as a master to delegate a task of generating the video frame information 406B and the audio frames 412B to the node 2.

In one embodiment, in a multi-player game, the frame packets that are described in FIG. 4A and sent from the network communication device 208A are broadcasted to multiple client devices, e.g., the client devices 104A and 104B, etc. For example, the frame packets are sent from the network communication device 208A to the client devices 104A and 104B via the computer network 112 for game play. Such broadcasting saves power in that calculations for generating the frame packets are executed once by the node 1 and the node 2, and the frame packets are broadcasted from the node 1 to the multiple client devices.

In an embodiment, the frame packets that include audio and video data and that are described in FIG. 4A and sent from the network communication device 208A are sent to spectators of the game. For example, the frame packets are sent from the network communication device 208A via the computer network 112 to a server hosting a spectator service, such as Youtube™ or Twitch™ or an e-sports service, for further viewing by spectators.

In one embodiment, the node 1 includes an audio renderer, such as an integrated circuit, that renders audio data to generate an audio wave. The audio wave is then encoded by the audio encoder 402A. The rendering of the audio data is performed based on a speaker configuration, such as stereo 5.1 or stereo 7.1, of the client device 104A.

In an embodiment in which the node 1 excludes an audio renderer, audio data is encoded by the audio encoder 402A and streamed from the node 1 via the computer network 112 to the client device 104A. The client device 104A includes an audio renderer that renders the audio data to generate the audio wave. For example, the client device 104A renders the audio wave by placing each virtual object in space and calculating the audio wave. The calculation depends on a number of speakers of the client device 104A, such as stereo 5.1 or stereo 7.1.

In one embodiment, rendering of audio data to generate an audio wave is not performed within the node 2. The node 2 does not include an audio renderer. Rather, the audio data associated with the video frame information 406B is sent from the node 2 to the node 1 via the internal communication devices 210B and 210A, and rendering of the audio wave is performed by an audio renderer of the node 1. The audio wave is then encoded by the audio encoder 402A.

Figure 4B:
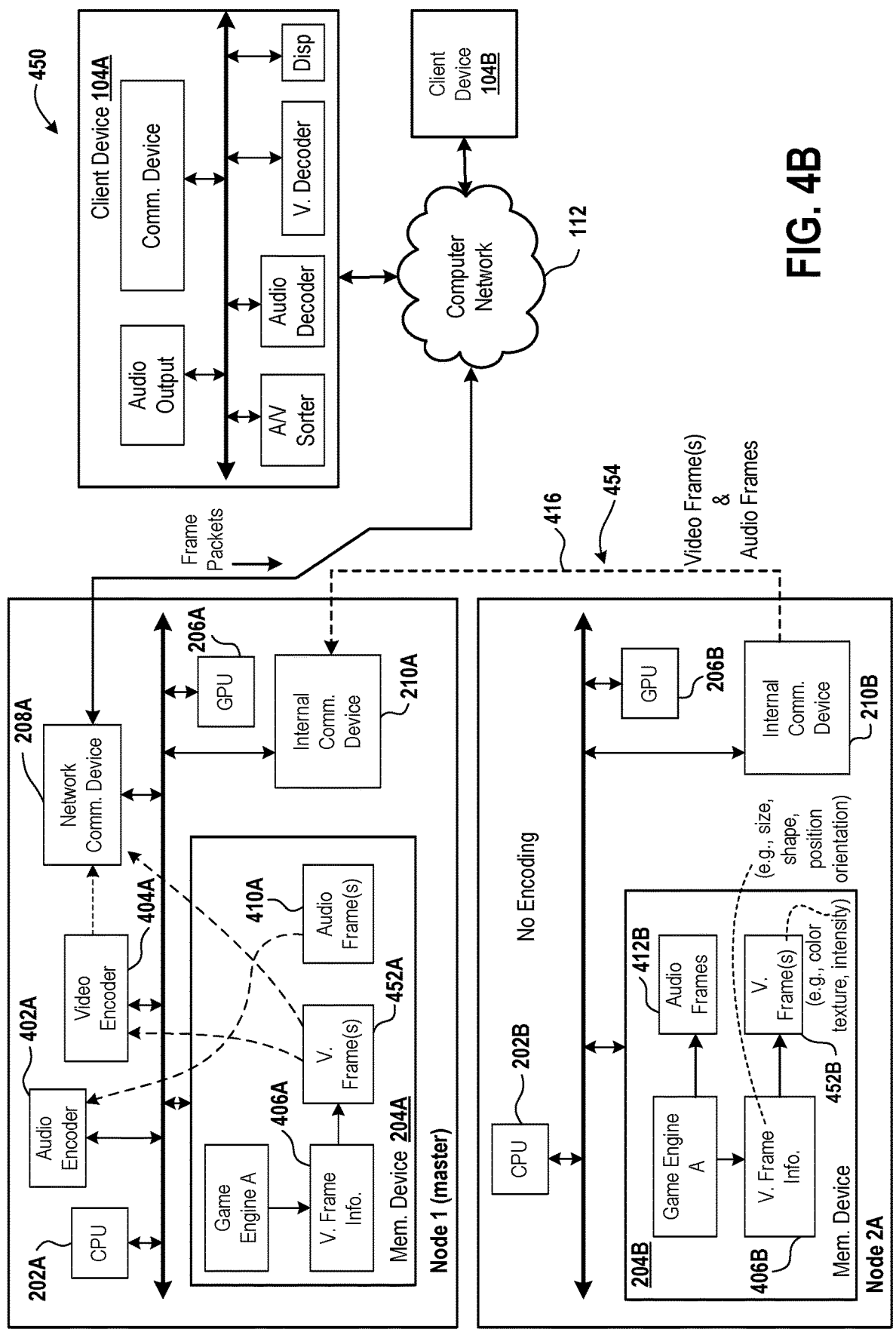
FIG. 4B is a diagram of an embodiment of a system to illustrate another embodiment of the distributed game engine.

FIG. 4B is a diagram of an embodiment of a system 450 to illustrate another embodiment of the distributed game engine 102 of FIG. 1 in which video frames are sent from a node 2A to the node 1. The system 450 includes the node 1, the node 2A, the computer network 112, and the client devices 104A and 104B. The node 2A is the same as the node 2 of FIG. 4A except that the node 2A includes a GPU 206B. The node 2A does not include an audio encoder and a video encoder.

The GPU 206B applies the rendering code A to generate a plurality of video frames 452B from the video frame information 406B. For example, the GPU 206B determines lighting intensity, textures, shading, and colors to be applied to one or more virtual scenes to generate the video frames 452B.

The internal communication device 210B of the node 2 applies the internal communication protocol to the video frames 452B and the audio frames 412B to generate packaged information 454, e.g., packets, transfer units, etc., and sends the packaged information 454 via the communication link 416 to the internal communication device 210A. In one embodiment, other operations, such as sample rate conversion, amplification, and audio filtering on audio data is performed within the node 2 before generating the audio frames 412B. The audio data is later converted to sound that is output simultaneously with a display of the video frames 452B.

The internal communication device 210A receives the packaged information 454 and applies the internal communication protocol to the packaged information 454, e.g., depacketizes the transfer units, etc., to extract the video frames 452B and the audio frames 412B from the packaged information 452. The video frame information 406B and the audio frames 412B are stored in the memory device 204A.

The GPU 206A accesses the video frame information 406A from the memory device 204A and applies the rendering code A to the video frame information 406A to generate a plurality of video frames 452A. The video encoder 404A encodes the video frames 452A and the video frames 452B to generate encoded video frames. The audio encoder 402A encodes the audio frames 410A and the audio frames 412B to generate encoded audio frames. The network communication device 208A applies the external communication protocol to the encoded audio frames and the encoded video frames to generate a plurality of frame packets and sends the frame packets via the computer network 112 to the client device 104A.

In an embodiment, the node 1 acts as a master to delegate a task of generating the video frames 452B to the node 2A.

In one embodiment, in the multi-player game, the frame packets described in FIG. 4B that are sent from the network communication device 208A are broadcasted to multiple client devices, e.g., the client devices 104A and 104B, etc. For example, the frame packets are generated once by the nodes 1 and 2A and are sent from the network communication device 208A to the client devices 104A and 104B via the computer network 112 for game play to save power. The frame packets do not need to be generated again for each different client device allowed to access the game engine A.

Figure 5A:
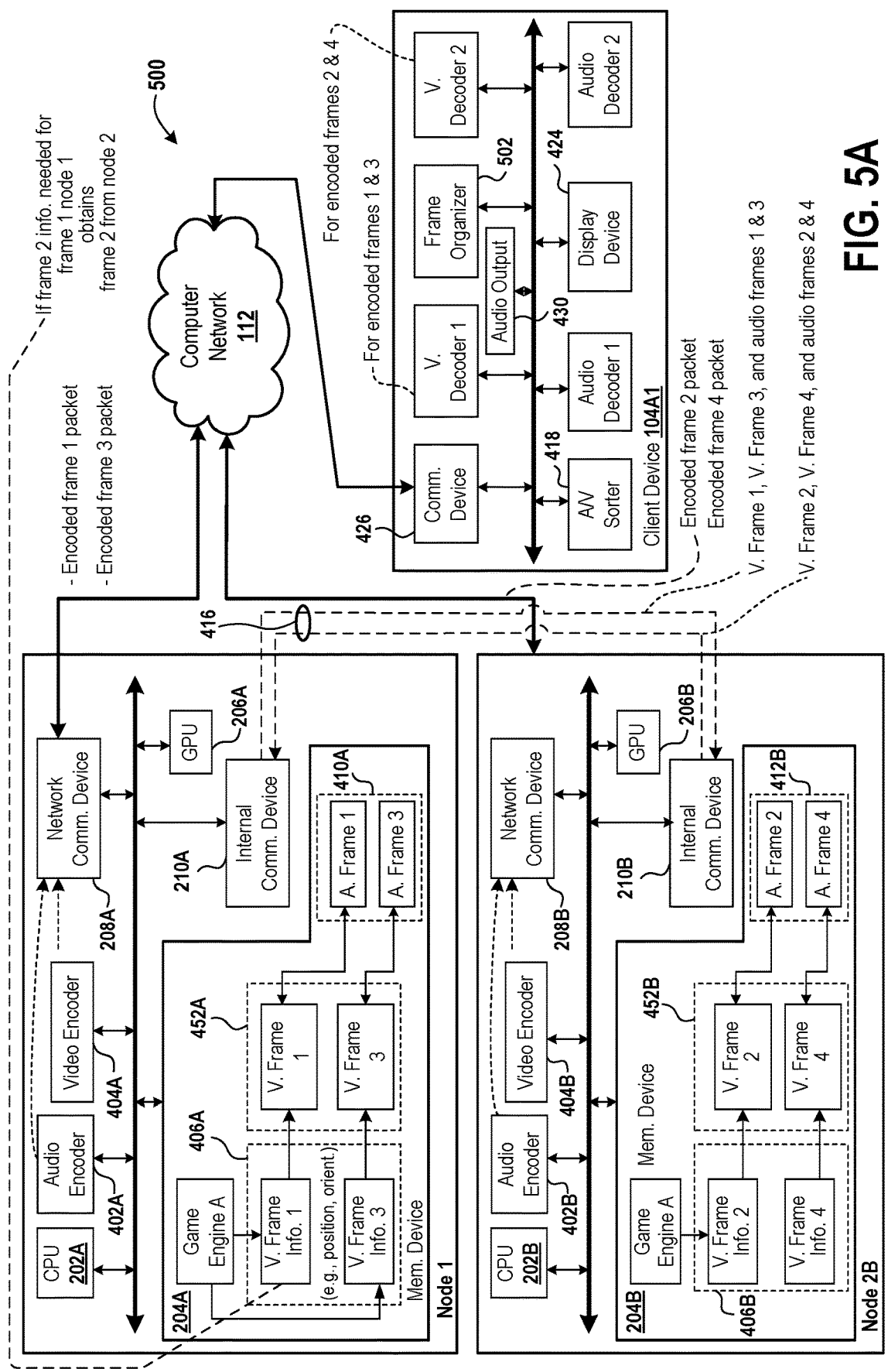
FIG. 5A is a diagram of an embodiment of a system to illustrate yet another embodiment of the distributed game engine.

FIG. 5A is a diagram of an embodiment of a system 500 to illustrate yet another embodiment of the distributed game engine 102 of FIG. 1. The system 500 includes the node 1, a node 2B, the computer network 112, and a client device 104A1. The node 2B is the same as the node 2A of FIG. 4B except that the node 2B includes an audio encoder 402B, a video encoder 404B, and a network communication device 208B.

The client device 104A1 is the same as the client device 104A of FIG. 4B except that the client device 104A1 includes a video decoder 1, a video decoder 2, an audio decoder 1, an audio decoder 2, and a frame organizer 502. The frame organizer 502 is a hardware device, e.g., a processor, integrated circuit, etc., or a software module, e.g., a computer program, or a combination thereof to organize the video frames 1 through 4 in a consecutive order for display on the display device 424. Moreover, the frame organizer 502 organizes the audio frames 1 through 4 in a consecutive order for outputting sounds associated with the video frames 1 through 4 in a consecutive order.

The video frame information 406A includes video frame information 1 and video frame information 3. Similarly, the video frame information 406B includes video frame information 2 and video frame information 4. The video frame information 1 is information regarding a video frame 1 of a virtual scene, the video frame information 2 is information regarding a video frame 2 of a virtual scene, the video frame information 3 is information regarding a video frame 3 of a virtual scene, and the video frame information 4 is information regarding a video frame 4 of a virtual scene. As an example, each video frame information 1 through 4 includes positions, orientations, sizes, and shapes of one or more virtual objects and/or background in a virtual scene.

The video frames 1 through 4 are to be displayed in a consecutive order. For example, the video frame 2 is to be displayed on the client device 104A1 after the video frame 1 is displayed on the client device 104A1. The video frame 3 is to be displayed on the client device 104A1 after the video frame 2 is to be displayed on the client device 104A1. The video frame 4 is to be displayed on the client device 104A1 after the video frame 3 is to be displayed on the client device 104A1. In one embodiment, a video frame, as used herein, is composed of lines of picture elements and has a resolution that is controlled by a number of the picture elements. Each picture element has a color and a light intensity to define a shape, a size, and a texture of a virtual object or a background.

The video frames 452A include the video frames 1 and 3. Moreover the video frames 452B include the video frames 2 and 4. Similarly, the audio frames 410A include an audio frame 1 and an audio frame 3, and the audio frames 410B include an audio frame 2 and an audio frame 4. The audio frame 1 has audio data that is to be emitted as sound by the client device 104A1 simultaneously with the display of the video frame 1. Similarly, the audio frame 2 has audio data that is to be emitted as sound by the client device 104A1 simultaneously with the display of the video frame 2, the audio frame 3 has audio data that is to be emitted as sound by the client device 104A1 simultaneously with the display of the video frame 3, and the audio frame 4 has audio data that is to be emitted as sound by the client device 104A1 simultaneously with the display of the video frame 4.

Before generating the video frames 1 and 3, the CPU 202A and the GPU 206A wait for receipt of the video frames 2 and 4 from the node 2B. In an embodiment, before generating the video frames 1 and 3, the CPU 202A sends a request for the video frames 2 and 4 and for the audio frames 2 and 4 via the internal communication device 206A, the communication link 416, and the internal communication device 206B to the CPU 202B. Upon receipt of the video frames 2 and 4 and storage of the video frames 2 and 4 in the memory device 204A, the CPU 202A extracts the video frame information 4 from the video frame 4, extracts the video frame information 2 from the video frame 2, and applies the video frame information 4 and the video frame information 2 to generate the video frame information 3 and to generate the video frame information 1. For example, the video frame information 2 indicates that a virtual ball is at a position 2 and the video frame information 4 indicates that the virtual ball is at a position 4. The CPU 202A determines from the positions 2 and 4 that the virtual ball is to be at a position 3 between the positions 2 and 4. The video frame information 3 includes the position 3 of the virtual ball. As another example, the video frame information 2 indicates that a virtual ball is at the position 2 and the physics engine code A indicates that the law of gravity is to be followed. The CPU 202A determines from the position 2 and the law of gravity that the virtual ball is to be at the position 3, which is below the position 2. The video frame information 1 is rendered by the GPU 206A to generate a video frame 1 and the video frame information 3 is rendered by the GPU 206A to generate the video frame 3. Similarly, the audio frames 1 and/or 3 are generated from audio data of the audio frames 2 and/or 4.

Furthermore, the video encoder 404A encodes the video frames 1 and 3 to generate encoded video frames and sends the encoded video frames to the network communication device 208A. Moreover, the audio encoder 402A encodes the audio frames 1 and 3 to generate encoded audio frames and sends the encoded audio frames to the network communication device 208A. The network communication device 208A applies the external communication protocol to the encoded video and encoded audio frames to generate multiple packets that include the encoded video and encoded audio frames. The packets are sent via the computer network 112 from the node 1 to the client device 104A1.

Similarly, before generating the video frames 2 and 4, the CPU 202B and the GPU 206B wait for receipt of the video frames 1 and 3 from the node 1. In an embodiment, before generating the video frames 2 and 4, the CPU 202B sends a request for the video frames 1 and 3 and for the audio frames 1 and 3 via the internal communication device 206B, the communication link 416, and the internal communication device 206A to the CPU 202A. Upon receipt of the request, the CPU 202A sends the video frames 1 and 3 and the audio frames 1 and 3 to the internal communication device 210A. The internal communication device 210A applies the internal communication protocol to the video frames 1 and 3 and the audio frames 1 and 3 to generate packaged information and sends the package information via the communication link 416 to the internal communication device 210B. The internal communication device 210 B applies the internal communication protocol to extract the video frames 1 and 3 and the audio frames 1 and 3 from the packaged information. The video frames 1 and 3 and the audio frames 1 and 3 are stored in the memory device 204B.

Upon receipt of the video frames 1 and 3 and storage of the frames 1 and 3 in the memory device 204B, the CPU 202B extracts the video frame information 1 from the video frame 1, extracts the video frame information 3 from the video frame 3, and applies the game engine A to video frame information 1 and the video frame information 3 to generate the video frame information 2 and to generate the video frame information 4. For example, the video frame information 1 indicates that the virtual ball is at a position 1 and the video frame information 3 indicates that the virtual ball is at the position 3. The CPU 202B determines from the positions 1 and 3 that the virtual ball is to be at a position 2 between the positions 1 and 3. The video frame information 2 includes the position 2 of the virtual ball. As another example, the video frame information 3 indicates that a virtual ball is at the position 3 and the physics engine code A indicates that the law of gravity is to be followed. The CPU 202B determines from the position 3 and the law of gravity that the virtual ball is to be at the position 4, which is below the position 3. The video frame information 2 is rendered by the GPU 206B to generate the video frame 2 and the video frame information 4 is rendered by the GPU 206B to generate the video frame 4. Similarly, the audio frames 2 and/or 4 are generated from audio data of the audio frames 1 and/or 3.

Furthermore, the video encoder 404B encodes the video frames 2 and 4 to generate encoded video frames and sends the encoded video data to the network communication device 208B. Moreover, the audio encoder 402B encodes the audio frames 2 and 4 to generate encoded audio frames and sends the encoded audio frames to the network communication device 208B. The network communication device 208B applies the external communication protocol to the encoded video and encoded audio frames to generate multiple packets that include the encoded video and encoded audio frames. The packets are sent via the computer network 112 from the node 2B to the client device 104A1.

The communication device 426 of the client device 104A1 receives the packets from the node 1 via the computer network 112 and applies the external communication protocol to the packets to obtain the encoded video frames and the encoded audio frames sent from the node 1. Similarly, the communication device 426 receives the packets from the node 2B via the computer network 112 and applies the external communication protocol to the packets to obtain the encoded video frames and the encoded audio frames sent from the node 2B.

The A/V sorter 418 differentiates among the encoded audio frames received from the node 1, the encoded audio frames received from the node 2B, the encoded video frames received from the node 1, and the encoded video frames received from the node 2B. The A/V sorter 418 sends the encoded audio frames received from the node 1 to the audio decoder 1, sends the encoded audio frames received from the node 2B to the audio decoder 2, sends the encoded video frames received from the node 1 to the video decoder 1, and sends the encoded video frames received from the node 2B to the video decoder 2. The audio decoder 1 decodes the encoded audio frames received from the node 1 and the video decoder 1 decodes the encoded video frames received from the node 1. Similarly, the video decoder 2 decodes the encoded video frames received from the node 2B and the audio decoder 2 decodes the encoded audio frames received from the node 2B.

The frame organizer 502 receives the video frames from the video decoders 1 and 2, and organizes the video frames 1 through 4 in a sequential consecutive order. Moreover, the frame organizer 502 receives the audio frames from the audio decoders 1 and 2, and organizes the audio frames 1 through 4 in a sequential consecutive order. For example, the video frames 1 and 3 are stored in a buffer in the client device 104A1 until the frames 2 and 4 arrive at the client device 104A1. The frames 2 and 4 may arrive late due to network latency variations or may be lost. In case the frames 2 and 4 are lost, a forward error correction is applied. When the forward error correction is applied, the client device 104A1 notifies the video encoders 404A and 404B and the audio encoders 402A and 402B of the loss. After receiving the notification, the video encoders 404A and 404B and the audio encoders 402A and 402B do not use any data from the lost frames to encode newer frames. Instead, the video encoders 404A and 404B and the audio encoders 402A and 402B use other frames, either generated before the lost frames or generated after the lost frames, to encode the newer frames.

The audio frames 1 through 4 are sent from the frame organizer 502 to the audio output device 430 to output sound associated with the video frames 1 through 4 and the video frames 1 through 4 are sent from the frame organizer 502 to the display device 424 to display the video frames 1 through 4. For example, the video frame 1 is displayed simultaneous with an output of a sound from the audio frame 1, the video frame 2 is displayed simultaneous with an output of a sound from the audio frame 2, the video frame 3 is displayed simultaneous with an output of a sound from the audio frame 3, and the video frame 4 is displayed simultaneous with an output of a sound from the audio frame 4.

In one embodiment, the video decoder 1 applies a different video file format or a streaming video format, e.g., H.264, than that applied by the video decoder 2, e.g., customized format, to decode encoded video frames. In an embodiment, the audio decoder 1 applies a different audio file format or a streaming audio format than that applied by the audio decoder 2 to decode encoded audio frames.

In an embodiment, instead of using two different video decoders 1 and 2, a single video decoder is used to decode the encoded video frames received from the nodes 1 and 2B. Moreover, in one embodiment, instead of using two different audio decoders 1 and 2, a single audio decoder is used to decode the encoded audio frames received from the nodes 1 and 2B.

In one embodiment, the video frames 1 and 3 are generated without using any information from the video frames 2 and 4 and the audio frames 1 and 3 are generated without using any information from the audio frames 2 and 4. In this case, there is no need to send the video frames 2 and 4 and the audio frames 2 and 4 from the node 2B to the node 1.

Similarly, in an embodiment, the video frames 2 and 4 are generated without using any information from the video frames 1 and 3 and the audio frames 2 and 4 are generated without using any information from the audio frames 1 and 3. In this case, there is no need to send the video frames 1 and 3 and the audio frames 1 and 3 from the node 1 to the node 2B.

In one embodiment, the exchange of the video frames 1, 2, 3, and 4 and/or the audio frames 1, 2, 3, and 4 between the nodes 1 and 2B is performed continuously, e.g., without exceeding a pre-determined delay, at a pre-determined frequency, etc., to achieve a frame rate of display of the video frames 1, 2, 3, and 4 on the display device 424 of the client device 104A1. It appears to the client device 104A as if the nodes 1 and 2B are an aggregated node, e.g., one and the same node.

In an embodiment, the video encoder 404A decodes encoded video data that is received from the client device 104A1 via the computer network 112 and the network communication device 208A. For example, the video data is captured by a camera, such as a depth camera or a web camera or an infrared camera, that is coupled to the client device 104A1 or is a part of the client device 104A1. Moreover, the audio encoder 402A decodes encoded audio data that is received from the client device 104A1 via the computer network 112 and the network communication device 208A. For example, the audio data is captured by a microphone, which is coupled to the client device 104A1 or is a part of the client device 104A1. Similarly, the video encoder 404B decodes encoded video data that is received from the client device 104A1 via the computer network 112 and the network communication device 208A. Moreover, the audio encoder 402B decodes encoded audio data that is received from the client device 104A1 via the computer network 112 and the network communication device 208A.

In an embodiment in which each node 1 and node 2B excludes an audio renderer, audio data for a virtual object that is to be represented by the video frames 1 and 3 is encoded by the audio encoder 402A and streamed from the node 1 via the computer network 112 to the client device 104A1. The client device 104A1 includes an audio renderer that renders the audio data to generate the audio wave. For example, the client device 104A1 renders the audio wave by placing the virtual object in space and calculating the audio wave. The calculation depends on a number of speakers of the client device 104A1, such as stereo 5.1 or stereo 7.1. Similarly, audio data for another virtual object or a background that is to be represented by the video frames 2 and 4 is encoded by the audio encoder 402B and streamed from the node 2B via the computer network 112 to the client device 104A1. The client device 104A1 uses the same audio renderer used to render the audio data received from the node 1 or another audio renderer to render the audio data received from the node 2B to generate another audio wave for the other virtual object or background.

In one embodiment, in the multi-player game, the frame packets described in FIG. 5A that are sent from the network communication devices 208A and 208B are broadcasted to multiple client devices, e.g., the client device 104A1 and another client device, etc. For example, the frame packets are generated once by the nodes 1 and 2B and are sent from the network communication devices 208A and 208B to the multiple client devices via the computer network 112 for game play to save power. The frame packets sent by the nodes 1 and 2B do not need to be generated again for each different client device allowed to access the game engine A from the nodes 1 and 2B simultaneously.

Figure 5B:
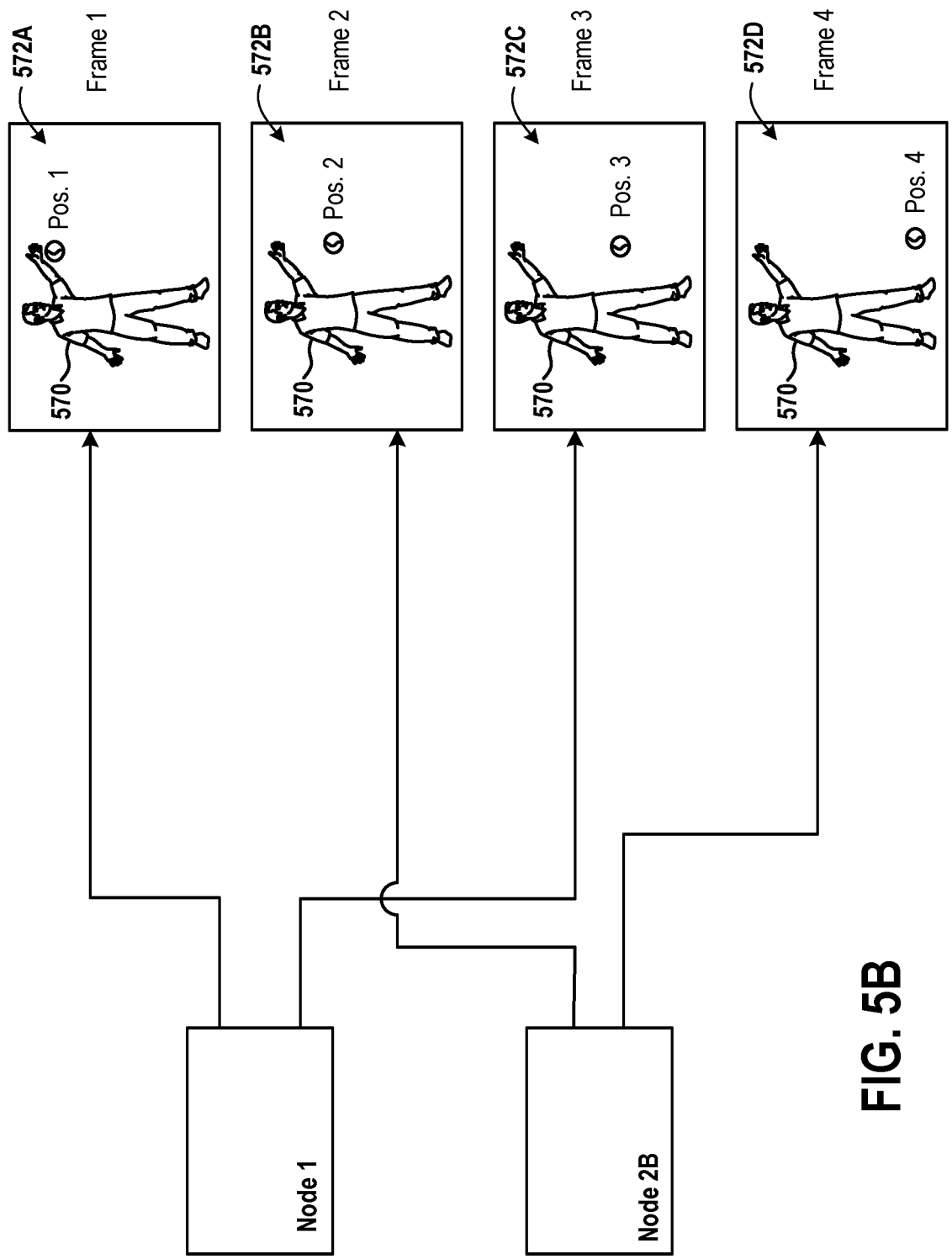
FIG. 5B is a diagram to illustrate that one or more frames for a game are generated by a node and one or more frames for the game are generated by another node.

FIG. 5B is a diagram to illustrate that the frames 1 and 3 are generated by the node 1 and the frames 2 and 4 are generated by the node 2B of FIG. 5A or the node 2A of FIG. 4B. As indicated in the frame 1, the virtual ball is at the position 1 and/or at an orientation 1 when released by a virtual user 570 in a virtual scene 572A. Moreover, in the frame 2 of a virtual scene 572B, the virtual ball is at the position 2 and/or at an orientation 2, in the frame 3 of a virtual scene 572C, the virtual ball is at the position 3 and/or at an orientation 3, and in the frame 4 of a virtual scene 572D, the virtual ball is at the position 4 and/or at an orientation 4. The virtual user 570 is an avatar of the user 1, who is real user, e.g., a person. The position 2 of the virtual ball is below the position 1. Also, the position 3 of the virtual ball is below the position 2 and the position 4 of the virtual ball is below the position 2.

In one embodiment, the virtual ball is at the same orientation in all the frames 1 through 4. In an embodiment, the virtual ball is at the same position in all the frames 1 through 4 but has different orientations in the frames.

In one embodiment, in the multi-player game, the frame packets described in FIG. 5B that are sent from the network communication devices 208A and 208B are broadcasted to multiple client devices, e.g., the client device 104A1 and another client device, etc. The frame packets sent by the nodes 1 and 2B do not need to be generated again for each different client device allowed to access the game engine A from the nodes 1 and 2B simultaneously.

Figure 6A:
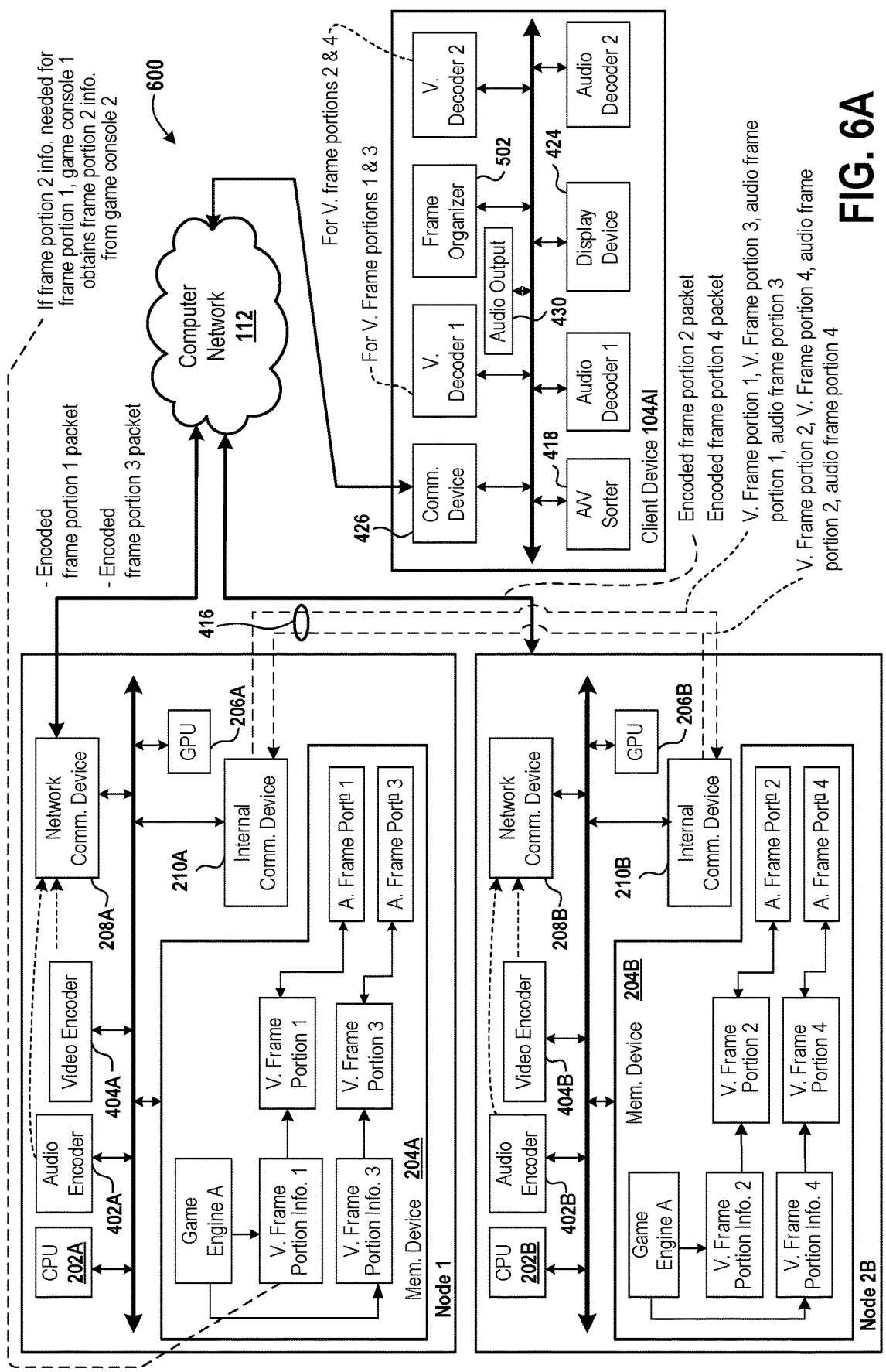
FIG. 6A is a diagram of an embodiment of a system to illustrate yet another embodiment of the distributed game engine.

FIG. 6A is a diagram of an embodiment of a system 600 to illustrate yet another embodiment of the distributed game engine 102 of FIG. 1 in which a video frame portion of a video frame from a node is used to generate a video frame portion of another node. The system 600 includes the nodes 1 and 2B, the computer network 112, and the client device 104A1.

The CPU 202A executes the game engine A to generate a video frame portion information 1 of the video frame 1 and a video frame portion information 3 of the video frame 1. For example, the CPU 202A executes the game code A and the CPU 202A and/or the GPU 206A execute the physics engine A to generate positions, sizes, shapes, and orientations of a portion of a virtual scene of the game 1. Examples of video frame portion information, as used herein, include a position, a size, a shape, an orientation, or a combination thereof of a portion of a virtual scene. An example of a portion of a virtual scene is a virtual object within a video frame or a background of the video frame. Another example of a portion of a video scene is a pre-determined number of adjacent pixels within a video frame. Yet another example of a portion of a virtual scene is a pre-determined number of adjacent pixels within a quadrant of a video frame. Still another example of a portion of a video scene is a pre-determined number of adjacent lines within a video frame. Another example of a portion of a virtual scene is one or more virtual objects within a video frame. Yet another example of a portion of a virtual scene is a portion of a virtual object within a video frame or a portion of a background within the video frame.

The GPU 206A accesses the video frame portion information 1 from the memory device 204A and applies the rendering code A to the video frame portion information 1 to generate a video frame portion 1 of the video frame 1. Similarly, the GPU 206A accesses the video frame portion information 3 from the memory device 204A and applies the rendering code A to the video frame portion information 3 to generate a video frame portion 3 of the video frame 1. For example, the GPU 206A determines to apply a color, a shade, an intensity, and/or a texture to a first virtual object in the video frame 1 and to apply a color, a shade, an intensity, and/or a texture to a background within the video frame 3.

Moreover, an audio frame portion 1 and an audio frame portion 3 are generated by one or more processors, e.g., the CPU 202A, etc., of the node 1. The audio frame portion 1 is associated with the video frame portion 1 in that the audio frame portion 1 provides audio data for sound to be emitted by the video frame portion 1 within the video frame 1. For example, the audio frame portion 1 includes audio data for a sound to be emitted by a virtual object or a background or a portion within the video frame 1. The audio frame portion 3 is associated with the video frame portion 3 in that the audio frame portion 3 provides audio data for sound to be emitted by the video frame portion 3 within the video frame 1. For example, the audio frame portion 3 includes audio data for a sound to be emitted by a virtual object or a background or a portion within the video frame 1.

Similarly, the CPU 202B executes the game engine A to generate a video frame portion information 2 and a video frame portion information 4. For example, the CPU 202B executes the game code A, and the CPU 202B and/or the GPU 206B execute the physics engine A to generate positions, sizes, shapes, and orientations of a portion of the virtual scene within the video frame 1, of the game 1, for which the video frame portion 1 and a video frame portion 3 are generated by the node 1.

The GPU 206B accesses the video frame portion information 2 from the memory device 204B and applies the rendering code A to the video frame portion information 2 to generate a video frame portion 2 of the video frame 1. Similarly, the GPU 206B accesses the video frame portion information 4 from the memory device 204B and applies the rendering code A to the video frame portion information 4 to generate a video frame portion 4 of the video frame 1. For example, the GPU 206B determines to apply a color, an intensity, and/or a texture to a second virtual object in the video frame 1 and to apply a color, an intensity, and/or a texture to a third virtual object within the video frame 1. The second virtual object is different from the first virtual object and the third virtual object is different from the first and second virtual objects. To illustrate, the first virtual object is an avatar of the user 1, the second virtual object is the virtual ball, and the third virtual object is a dog who is a pet of the avatar.

Moreover, audio frame portions 2 and 4 are generated by one or more processors, e.g., the CPU 202B, of the node 2B. The audio frame portion 2 includes audio data that is associated with the video frame portion 2 in that the audio data is to be emitted as sound by the video frame portion 2. Moreover, the audio frame portion 4 includes audio data that is associated with the video frame portion 4 in that the audio data is to be emitted as sound by the video frame portion 4.

Furthermore, the video encoder 404A encodes the video frame portions 1 and 3 to generate encoded video frame portions and sends the encoded video frame portions to the network communication device 208A. Moreover, the audio encoder 402A encodes the audio frame portions 1 and 3 to generate encoded audio frames and sends the encoded audio frame portions 1 and 3 to the network communication device 208A. The network communication device 208A applies the external communication protocol to the encoded video and encoded audio frame portions to generate multiple packets that include the encoded video and encoded audio frame portions. The packets are sent via the computer network 112 from the node 1 to the client device 104A1.

Also, the video encoder 404B encodes the video frame portions 2 and 4 to generate encoded video frame portions and sends the encoded video frame portions to the network communication device 208B. Moreover, the audio encoder 402B encodes the audio frame portions 2 and 4 to generate encoded audio frame portions and sends the encoded audio frame portions to the network communication device 208B. The network communication device 208B applies the external communication protocol to the encoded video and encoded audio frame portions to generate multiple packets that include the encoded video and encoded audio frame portions. The packets are sent via the computer network 112 from the node 2B to the client device 104A1.

The communication device 426 of the client device 104A1 receives the packets from the node 1 via the computer network 112 and applies the external communication protocol to the packets to obtain the encoded video frame portions and the encoded audio frame portions sent from the node 1. Similarly, the communication device 426 receives the packets from the node 2B via the computer network 112 and applies the external communication protocol to the packets to obtain the encoded video frame portions and the encoded audio frame portions sent from the node 2B.

The A/V sorter 418 differentiates among the encoded audio frame portions received from the node 1, the encoded audio frame portions received from the node 2B, the encoded video frame portions received from the node 1, and the encoded video frame portions received from the node 2B. The A/V sorter 418 sends the encoded audio frame portions received from the node 1 to the audio decoder 1, sends the encoded audio frame portions received from the node 2B to the audio decoder 2, sends the encoded video frame portions received from the node 1 to the video decoder 1, and sends the encoded video frame portions received from the node 2B to the video decoder 2. The audio decoder 1 decodes the encoded audio frame portions received from the node 1 and the video decoder 1 decodes the encoded video frame portions received from the node 1. Similarly, the video decoder 2 decodes the encoded video frame portions received from the node 2B and the audio decoder 2 decodes the encoded audio frame portions received from the node 2B. The video frame portions 1 through 4 are displayed on the display device 424 and the audio frame portions 1 through 4 are output as sound by the audio output device 430. For example, the video frame portion 1 is displayed simultaneous with an output of a sound from the audio portion 1, the video frame portion 2 is displayed simultaneous with an output of a sound from the audio frame portion 2, the video frame portion 3 is displayed simultaneous with an output of a sound from the audio frame portion 3, and the video frame portion 4 is displayed simultaneous with an output of a sound from the audio frame portion 4.

In one embodiment, before generating the video frame portions 1 and 3, the CPU 202A and the GPU 206A wait for receipt of the video frame portions 2 and 4 from the node 2B. For example, before generating the video frame portions 1 and 3, the CPU 202A sends a request for the video frame portions 2 and 4 and for the audio frame portions 2 and 4 via the internal communication device 206A, the communication link 416, and the internal communication device 206B to the CPU 202B. Upon receipt of the video frame portions 2 and 4 and storage of the video frame portions 2 and 4 in the memory device 204A, the CPU 202B extracts the video frame portion information 4 from the video frame portion 4, extracts the video frame portion information 2 from the video frame portion 2, and applies the video frame portion information 4 and/or the video frame portion information 2 to generate the video frame portion information 3 and/or to generate the video frame portion information 1. For example, the video frame portion information 2 indicates that a second portion of a virtual tree trunk is at a position 2 and the video frame information 4 indicates that a fourth portion of the virtual tree trunk is at a position 4. The CPU 202A determines from the positions 2 and 4 of the virtual tree trunk that a third portion of the virtual tree trunk is to be at a position 3 between the positions 2 and 4 of the virtual tree trunk. The video frame portion information 3 includes the position 3 of the third portion of the virtual tree trunk. As another example, the video frame portion information 2 indicates that the second portion of virtual tree trunk is at the position 2 and the physics engine code A indicates that the virtual tree trunk is to touch a virtual ground in the video frame 1. The CPU 202A determines from the position 2 and the physics engine code A that the third portion of the virtual tree trunk is to be at the position 3, which is below the position 2 of the virtual tree trunk. The video frame portion information 1 is rendered by the GPU 206A to generate the video frame portion 1 and the video frame portion information 3 is rendered by the GPU 206A to generate the video frame portion 3.

Similarly, in this embodiment, before generating the video frame portions 2 and 4, the CPU 202B and the GPU 206B wait for receipt of the video frame portions 1 and 3 from the node 1. For example, before generating the video frame portions 2 and 4, the CPU 202B sends a request for the video frame portions 1 and 3 and for the audio frame portions 1 and 3 via the internal communication device 206B, the communication link 416, and the internal communication device 206A to the CPU 202A. Upon receipt of the request, the CPU 202A sends the video frame portions 1 and 3 and the audio frame portions 1 and 3 to the internal communication device 210A. The internal communication device 210A applies the internal communication protocol to the video frame portions 1 and 3 and the audio frame portions 1 and 3 to generate packaged information and sends the packaged information via the communication link 416 to the internal communication device 210B. The internal communication device 210B applies the internal communication protocol to extract the video frame portions 1 and 3 and the audio frame portions 1 and 3 from the packaged information. The video frame portions 1 and 3 and the audio frame portions 1 and 3 are stored in the memory device 204B.

Upon receipt of the video frame portions 1 and 3 and storage of the video frame portions 1 and 3 in the memory device 204B, the CPU 202B extracts the video frame portion information 1 from the video frame portion 1, extracts the video frame portion information 3 from the video frame portion 3, and applies the video frame portion information 1 and/or the video frame portion information 3 to generate the video frame portion information 2 and/or to generate the video frame portion information 4. For example, the video frame portion information 1 indicates that a first portion of the virtual tree trunk is at a position 1 and the video frame portion information 3 indicates that the third portion of the virtual tree trunk is at the position 3. The CPU 202B determines from the positions 1 and 3 of the virtual tree trunk that the second portion of the virtual tree trunk is to be at the position 2 between the position 1 of the first portion of the virtual tree trunk and the position 3 of the third portion of the virtual tree trunk. The video frame portion information 2 includes the position 2 of the second portion of the virtual tree trunk. As another example, the video frame portion information 3 indicates that the third portion of the virtual tree trunk is at the position 3 and the physics engine code A indicates that the virtual tree trunk is to touch the virtual ground in the video frame 1. The CPU 202B determines from the position 3 of the third portion of the virtual tree trunk and the physics engine code A that the fourth portion of the virtual tree trunk is to be at the position 4, which is below the position 3 of the third portion of the virtual tree trunk. The video frame portion information 2 is rendered by the GPU 206B to generate the video frame portion 2 and the video frame portion information 4 is rendered by the GPU 206B to generate the video frame portion 4.

In one embodiment, the video decoder 1 applies a different video file format or a streaming video format, e.g., H.264, than that applied by the video decoder 2, e.g., customized format, to decode encoded video frame portions. In an embodiment, the audio decoder 1 applies a different audio file format or a streaming audio format than that applied by the audio decoder 2 to decode encoded audio frame portions.

In an embodiment, instead of using two different video decoders 1 and 2, a single video decoder is used to decode the encoded video frame portions received from the nodes 1 and 2B. Moreover, in one embodiment, instead of using two different audio decoders 1 and 2, a single audio decoder is used to decode the encoded audio frame portions received from the nodes 1 and 2B.

In one embodiment, the video frame portions 1 and 3 are generated without using any information from the video frame portions 2 and 4 and the audio frame portions 1 and 3 are generated without using any information from the audio frame portions 2 and 4. In this case, there is no need to send the video frame portions 2 and 4 and the audio frame portions 2 and 4 from the node 2B to the node 1.

Similarly, in an embodiment, the video frame portions 2 and 4 are generated without using any information from the video frame portions 1 and 3 and the audio frame portions 2 and 4 are generated without using any information from the audio frame portions 1 and 3. In this case, there is no need to send the video frame portions 1 and 3 and the audio frame portions 1 and 3 from the node 1 to the node 2B.

Figure 6B:
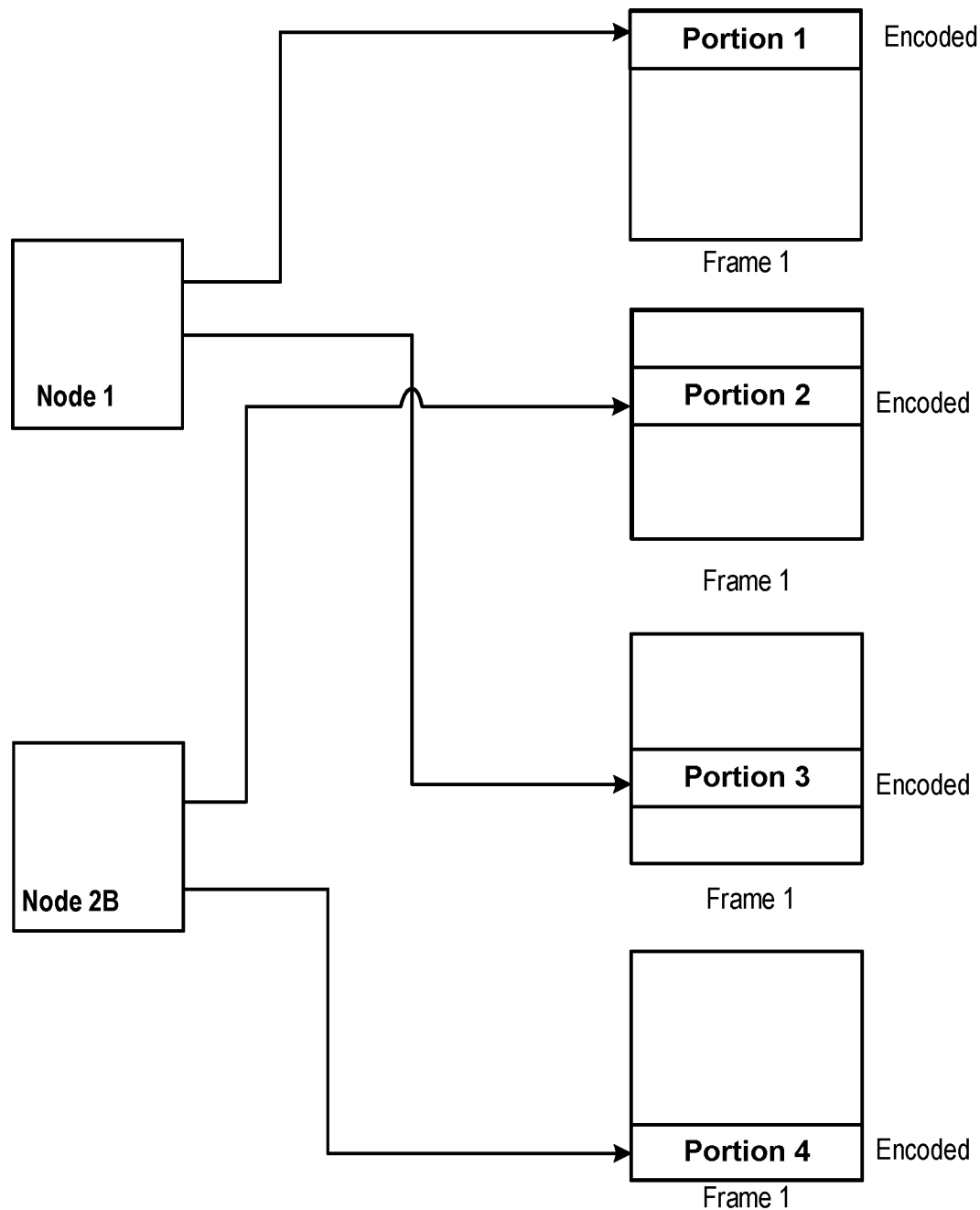
FIG. 6B is a diagram to illustrate an arrangement of video frame portions in a video frame having a virtual scene.

FIG. 6B is a diagram to illustrate an arrangement of the video frame portions 1 through 4 in the video frame 1 displaying a virtual scene. The video frame portion 1 of the video frame 1 includes a first set of one or more top lines of pixels in the video frame 1. Moreover, the video frame portion 2 of the video frame 1 includes a second set of one or more lines of pixels in the video frame 1 and the second set is adjacent to and below the first set. Also, the video frame portion 3 of the video frame 1 includes a third set of one or more lines of pixels in the video frame 1 and the third set is adjacent to and below the second set. The video frame portion 4 of the video frame 1 includes a fourth set of one or more lines of pixels in the video frame 1 and the fourth set is adjacent to and below the third set.

Figure 6C:
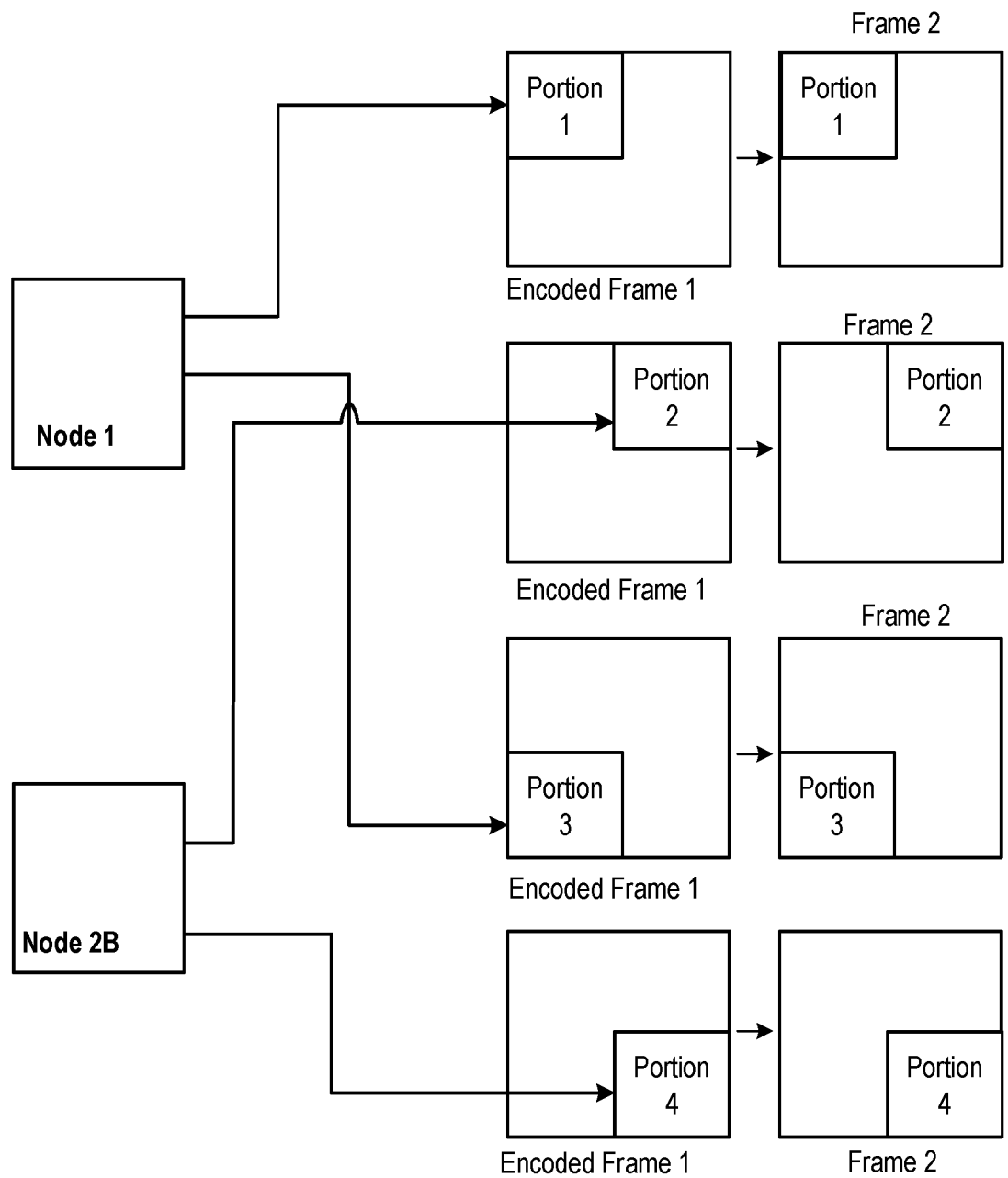
FIG. 6C is a diagram to illustrate another arrangement of the video frame portions in the video frame having the virtual scene.

FIG. 6C is a diagram to illustrate another arrangement of the video frame portions 1 through 4 in the video frame 1 displaying a virtual scene. The video frame portion 1 of the video frame 1 includes a set of one or more adjacent picture elements in a top left quadrant in the video frame 1. Moreover, the video frame portion 2 of the video frame 1 includes a set of one or more adjacent picture elements in a top right quadrant of the video frame 1. Also, the video frame portion 3 of the video frame 1 includes a set of one or more adjacent picture elements in a bottom left quadrant of the video frame 1. The video frame portion 4 of the video frame 1 includes a set of one or more adjacent picture elements in a bottom right quadrant of the video frame 1.

It should be noted that the node 1 generates video frame portions that lie in the same quadrant(s), such as the top left quadrant or the bottom left quadrant, across multiple video frames, e.g., the video frames 1 and 2, etc. Similarly, the node 2 generates video frame portions that lie in the same quadrant(s), such as the top right quadrant or the bottom right quadrant, across the multiple video frames.

In an embodiment, the node 1 generates video frame portions that lie in the different quadrant(s), such as the top left quadrant and the bottom left quadrant, across multiple video frames, e.g., the video frames 1 and 2, etc. Similarly, the node 2 generates video frame portions that lie in the different quadrant(s), such as the top right quadrant and the bottom right quadrant, across the multiple video frames.

Figure 7:
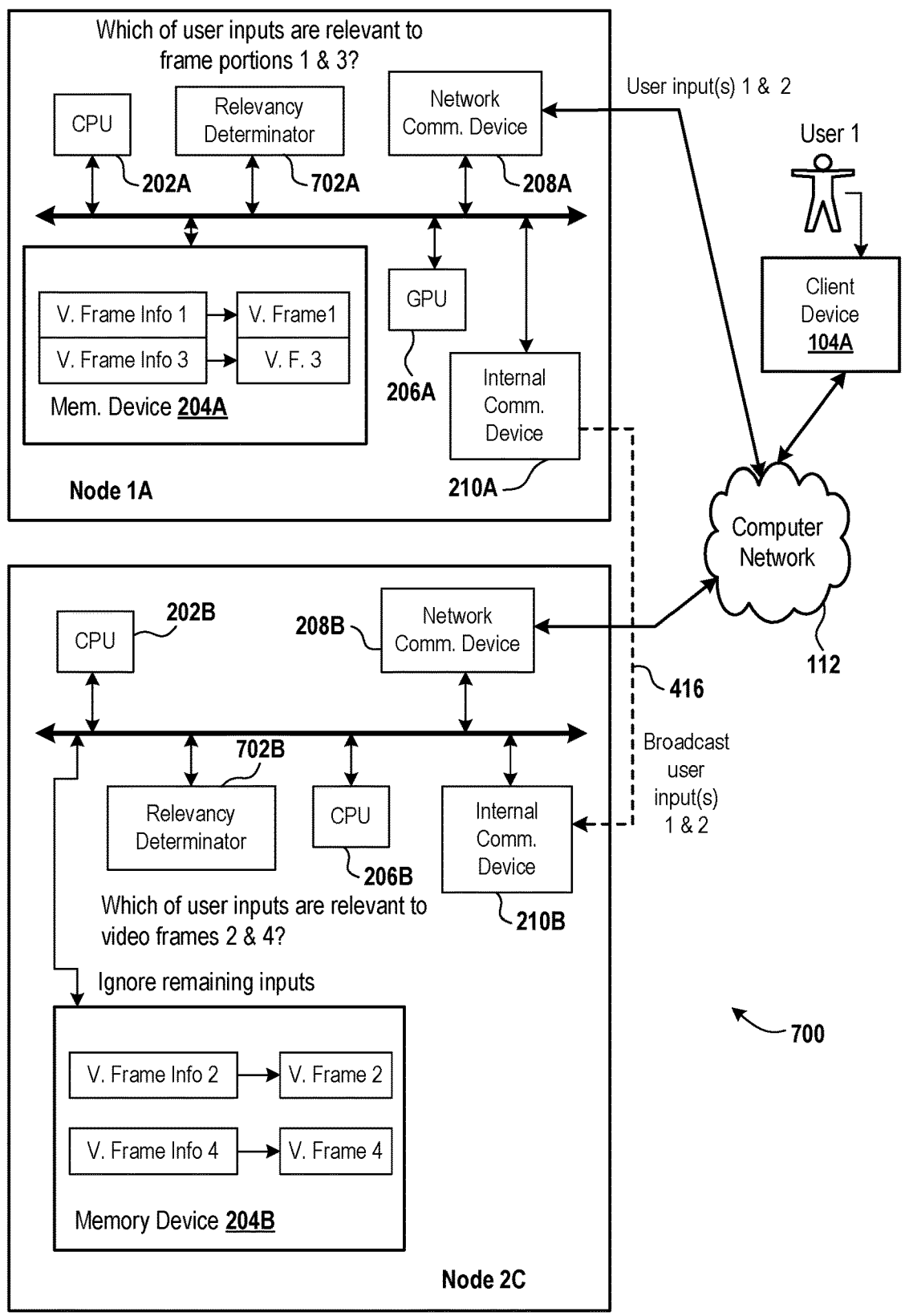
FIG. 7 is a diagram of an embodiment of a system to illustrate broadcasting of user inputs from one node to another node to determine relevancy of the user inputs to the other node for generation of video frames.

FIG. 7 is a diagram of an embodiment of a system 700 to illustrate broadcasting of user inputs from one node to another node to determine relevancy of the user inputs to the other node for generation of video frames. The system 700 includes a node 1A and the node 2C. The node 1A is the same as the node 1 of FIG. 6A except that the node 1A includes a relevancy determinator 702A. Moreover, the node 2C is the same as the node 2B of FIG. 6A except that the node 2C includes a relevancy determinator 702B.

Examples of a relevancy determinator include a hardware device, e.g., a processor, an integrated circuit, etc., or a software module, e.g., a computer program, etc., or a combination thereof, that determines a relevancy of user inputs for generation of video frames or video frame portions within a node. In one embodiment, a relevancy determinator of a node is integrated with a CPU and a GPU of the node. For example, a portion of the relevancy determinator of a node is integrated within a CPU of the node and the remaining portion of the relevancy determinator is integrated within a GPU of the node.

The user 1 provides a plurality of user inputs 1 and 2 via the client device 104A. A variety of ways in which the input 1 and 2 are captured are described above, e.g., using the camera or the hand-held controller. The inputs 1 and 2 are packetized and sent from the client device 104A via the computer network 112 to the network communication device 208A of the node 1A. The network communication device 208A depacketizes the inputs 1 and 2 and provides the inputs 1 and 2 to the internal communication device 210A.

The internal communication device 210A, under control of the CPU 202A, applies the internal communication protocol to broadcast the video and audio data of the user inputs 1 and 2 via the communication link 416 to the internal communication device 210B of the node 2C. The internal communication device 210B applies the internal communication protocol to extract the user inputs 1 and 2 from packaged information received from the internal communication device 210A, and provides the user inputs 1 and 2 to the relevancy determinator 702B.

The relevancy determinator 702B determines which of the user inputs 1 and 2 are relevant to generate the video frames 2 and 4. For example, the relevancy determinator 702B determines that the user input 1 changes a position, orientation, size, shape, intensity, color, texture, shading, or a combination thereof, of a virtual scene and the changed position, the changed orientation, the changed size, the changed shape, the changed intensity, the changed color, the changed texture, or the changed shade, or a combination thereof, are to be displayed in the video frame 2 or the video frame 4. In this example, the user input 1 is relevant to the video frame 2 or the video frame 4. To illustrate, the relevancy determinator 702B determines that the user input 1 will facilitate achieving the position 2 of the virtual ball within the video frame 2 or the position 4 of the virtual ball within the frame 4. As another example, the relevancy determinator 702B determines that the user inputs 1 and 2 both change a position, orientation, size, shape, intensity, color, texture, or a combination thereof, of a virtual scene and the changed position, the changed orientation, the changed size, the changed shape, the changed intensity, the changed color, the changed texture, or the changed shade, or a combination thereof, are to be displayed in the video frame 2 or the video frame 4. In this example, the user inputs 1 and 2 are relevant to the video frame 2 or the video frame 4. To illustrate, the relevancy determinator 702B determines that the user inputs 1 and 2 will facilitate achieving the position 2 of the virtual ball within the video frame 2 or the position 4 of the virtual ball within the frame 4.

The relevancy determinator 702B provides one or both of the user inputs 1 and 2 that are determined to be relevant to the video frames 2 and/or 4 to the CPU 202B and the GPU 206B. The relevancy determinator 702B ignores one or both of the user inputs 1 and 2 that are determined not to be relevant to the video frames 2 and 4. For example, the relevancy determinator 702B does not apply a user input that is not relevant to generate the video frames 2 and/or 4.

The CPU 202B applies the user inputs 1 and/or 2 that are determined to be relevant to generate the video frame information 2 and/or 4. Similarly, the GPU 206B applies the user inputs 1 and/or 2 that are determined to be relevant to generate the video frames 2 and/or 4.

In one embodiment, the video frame 1, the video frame 2, the video frame 3, the video frame 4, the audio frame 1, the audio frame 2, the audio frame 3, the audio frame 4, the video frame portion 1, the video frame portion 2, the video frame portion 3, the video frame portion 4, the audio frame portion 1, the audio frame portion 2, the audio frame portion 3, the audio frame portion 4, or a combination thereof, is referred to herein as state information.

In one embodiment, the video encoder 404A of the node 1, illustrated in FIG. 6A, decodes video data of the user inputs 1 and 2 when the user inputs 1 and 2 are encoded by the video decoder 1 or the video decoder 2 of the client device 104A1, illustrated in FIG. 6A. The video data of user inputs 1 and 2 is decoded by the video encoder 404A before broadcasting the user inputs 1 and 2 to the other nodes. In an embodiment, the audio encoder 402A of the node 1, illustrated in FIG. 6A, decodes audio data of the user inputs 1 and 2 when the user inputs 1 and 2 are encoded by the audio decoder 1 or the audio decoder 2 of the client device 104A1. The audio data of user inputs 1 and 2 is decoded by the audio encoder 402A before broadcasting the user inputs 1 and 2 to the other nodes.

In an embodiment, the relevancy determinator 702A determines whether one or both of the user inputs 1 and 2 are relevant to generating the video frames 1 and 3. For example, the relevancy determinator 702A determines that the user input 1 changes a position, orientation, size, shape, intensity, color, texture, or a combination thereof, of a virtual scene and the changed position, the changed orientation, the changed size, the changed shape, the changed intensity, the changed color, the changed texture, or the changed shade, or a combination thereof, are to be displayed in the video frame 1 or the video frame 3. In this example, the user input 1 is relevant. Upon determining that the user input 1 is relevant, the CPU 202A applies the user input 1 to generate the video frame information 1 and/or 3 and/or the GPU 206A applies the user input 1 to generate the video frames 1 and/or 3. Upon determining that the user inputs 1 and 2 are relevant to generating the video frames 1 and 3, the node 1A does not broadcast the user inputs 1 and 2 to the node 2C. On the other hand, upon determining that one or both of the user inputs 1 and 2 are not relevant to generating the video frames 1 and 3, the node 1A broadcasts the user inputs 1 and/or 2 to the node 2C.

In this embodiment, the video encoder 404A of the node 1, illustrated in FIG. 6A, decodes the video data of the user input 1 when the user input 1 is encoded by the video decoder 1 or the video decoder 2 of the client device 104A1, illustrated in FIG. 6A. The video data of the user input 2 that is sent to the node 2C from the node 1A is decoded by the video encoder 404B when the user input 2 is encoded by the video decoder 1 or the video decoder 2 of the client device 104A1. Also, the audio encoder 402A of the node 1, illustrated in FIG. 6A, decodes the audio data of the user input 1 when the user input 1 is encoded by the audio decoder 1 or the audio decoder 2 of the client device 104A1. The audio data of the user input 2 that is sent to the node 2C from the node 1A is decoded by the audio encoder 402B when the user input 2 is encoded by the audio decoder 1 or the audio decoder 2 of the client device 104A1.

In an embodiment, instead of the client device 104A, the client device 104A illustrated in FIG. 4A or the client device 104A1 illustrated in FIG. 6A is used.

Figure 8:
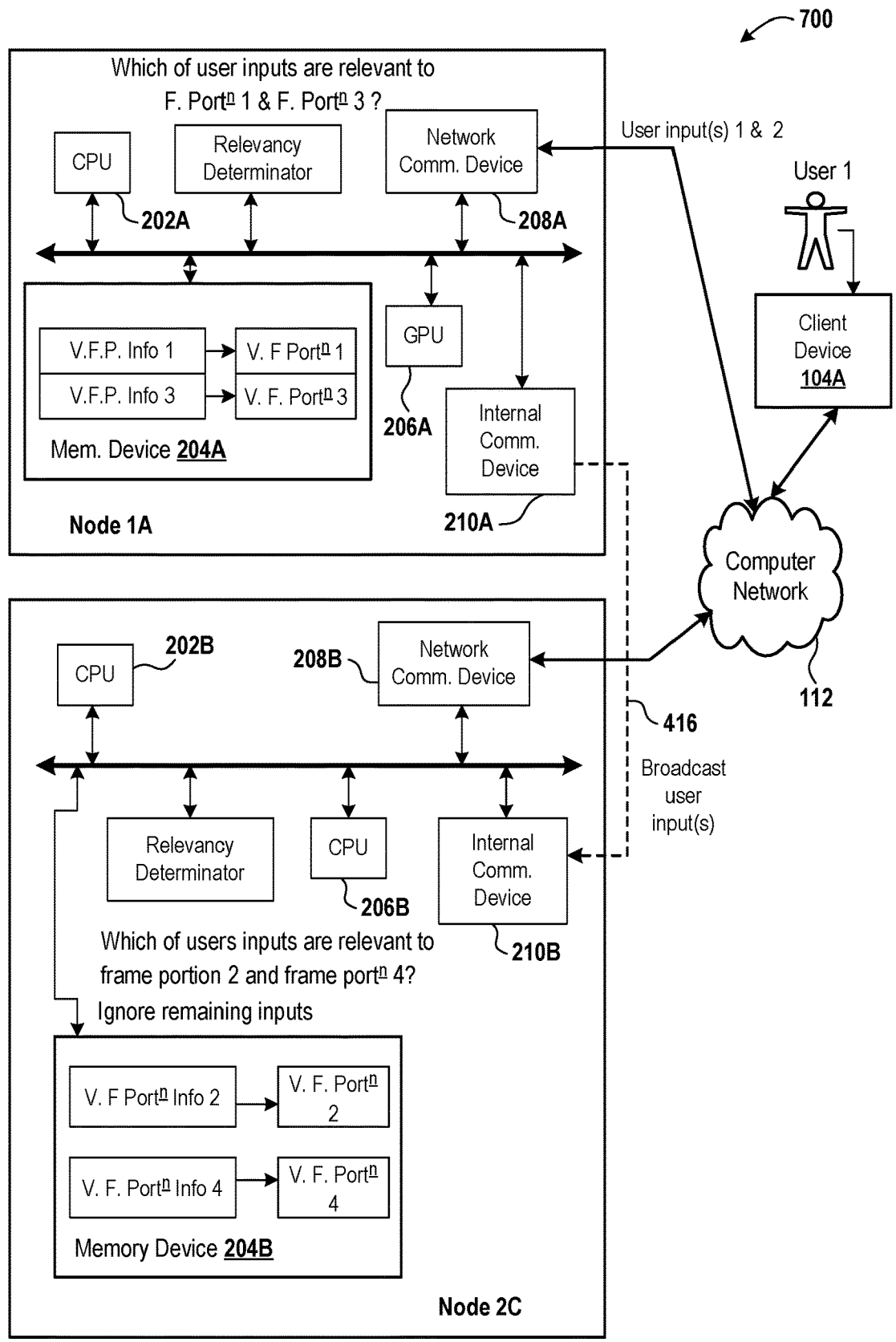
FIG. 8 is a diagram of an embodiment of the system of FIG. 7 to illustrate broadcasting of user inputs from one node to another node to determine relevancy of the user inputs to the other node for generation of video frame portions.

FIG. 8 is a diagram of an embodiment of the system 700 to illustrate broadcasting of user inputs from one node to another node to determine relevancy of the user inputs to the other node for generation of video frame portions. The relevancy determinator 702B determines which of the user inputs 1 and 2 are relevant to generate the video frame portions 2 and 4. For example, the relevancy determinator 702B determines that the user input 1 changes a position, orientation, size, shape, intensity, color, texture, shading, or a combination thereof, of a portion of a virtual scene in the video frame 1 and the changed position, the changed orientation, the changed size, the changed shape, the changed intensity, the changed color, the changed texture, or the changed shade, or a combination thereof, are to be displayed in the video frame portion 2 or the video frame portion 4. The user input 1 is relevant to the video frame portion 2 or the video frame portion 4. To illustrate, the relevancy determinator 702B determines that the user input 1 will facilitate displaying the position 2 of the second portion of the virtual tree trunk within the video frame 1 or the position 4 of the fourth portion of the virtual tree trunk within the video frame 1. As another example, the relevancy determinator 702B determines that the user inputs 1 and 2 both changes a position, orientation, size, shape, intensity, color, texture, or a combination thereof, of a portion of a virtual scene and the changed position, the changed orientation, the changed size, the changed shape, the changed intensity, the changed color, the changed texture, or the changed shade, or a combination thereof, are to be displayed in the video frame portion 2 or the video frame portion 4. The user inputs 1 and 2 are relevant to the video frame portion 2 or the video frame portion 4. To illustrate, the relevancy determinator 702B determines that the user inputs 1 and 2 will facilitate achieving the position 2 of the second portion of the virtual tree trunk within the video frame portion 2 or the position 4 of the fourth portion of the virtual tree trunk within the frame portion 4.

The relevancy determinator 702B provides one or both of the user inputs 1 and 2 that are determined to be relevant to the video frame portions 2 and/or 4 to the CPU 202B and the GPU 206B. The CPU 202B applies the user inputs 1 and/or 2 that are determined to be relevant to generate the video frame portion information 2 and/or 4. Similarly, the GPU 206B applies the user inputs 1 and/or 2 that are determined to be relevant to generate the video frame portions 2 and/or 4.

In an embodiment, the relevancy determinator 702A determines whether one or both of the user inputs 1 and 2 are relevant to generating the video frame portions 1 and 3. For example, the relevancy determinator 702A determines that the user input 1 changes a position, orientation, size, shape, intensity, color, texture, or a combination thereof, of a virtual object and the changed position, the changed orientation, the changed size, the changed shape, the changed intensity, the changed color, the changed texture, or the changed shade, or a combination thereof, are to be displayed in a portion of the video frame 1. The user input 1 is relevant. Upon determining that the user input 1 is relevant, the CPU 202A applies the user input 1 to generate the video frame portion information 1 and/or 3 and/or the GPU 206A applies the user input 1 to generate the video frame portions 1 and/or 3. Upon determining that the user inputs 1 and 2 are relevant to generating the video frame portions 1 and 3, the node 1A does not broadcast the user inputs 1 and 2 to the node 2C.

On the other hand, upon determining that one or both of the user inputs 1 and 2 are not relevant to generating the video frame portions 1 and 3, the node 1A broadcasts the user inputs 1 and/or 2 to the node 2C.

Figure 9:
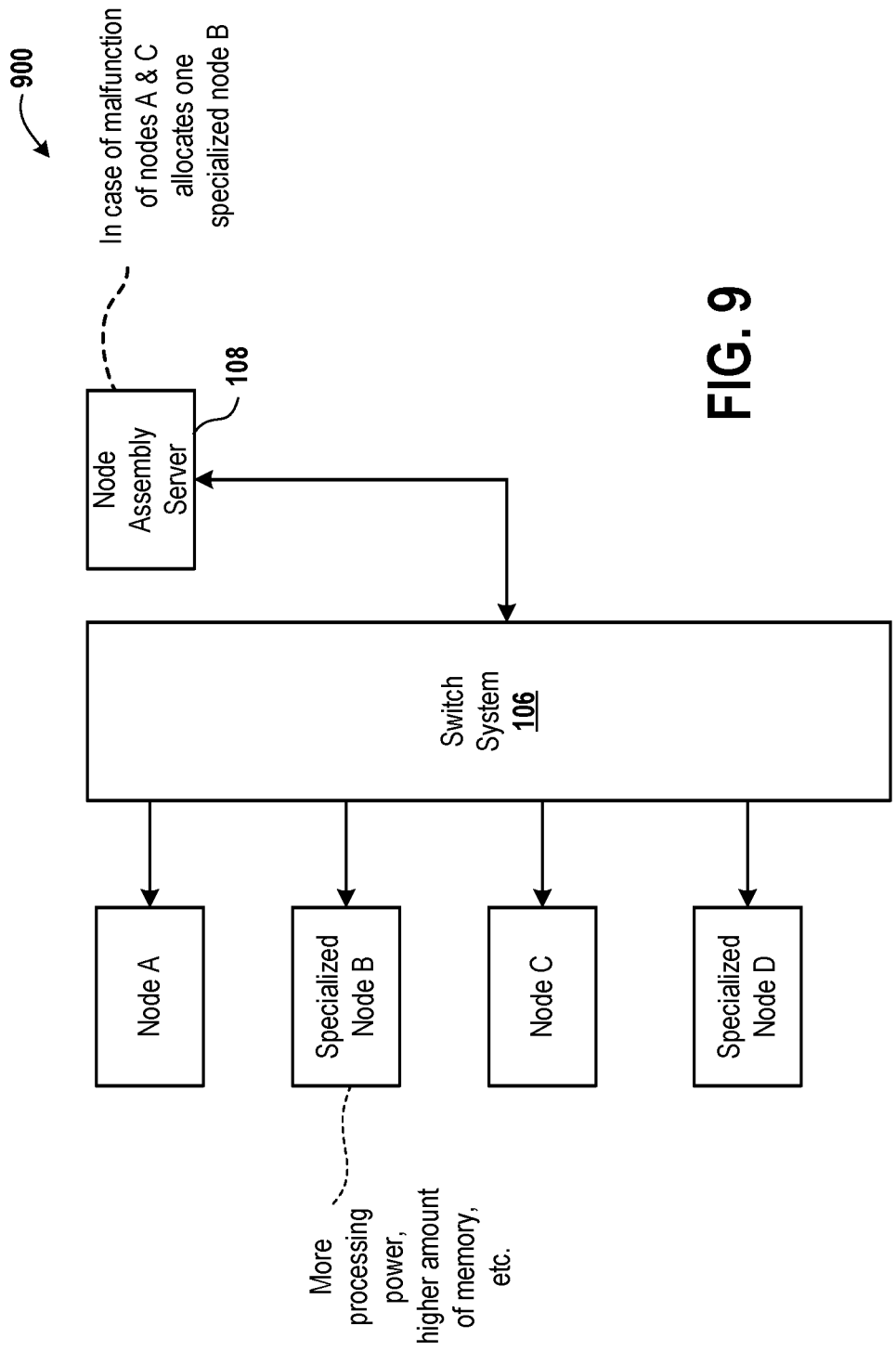
FIG. 9 is a diagram of an embodiment of a system to illustrate a dynamic change in a number of nodes that are selected to execute the distributed game engine.

FIG. 9 is a diagram of an embodiment of a system 900 to illustrate a dynamic change in a number of nodes that are selected to execute the distributed game engine 102 of FIG. 1. The system 900 includes a plurality of nodes A, B, C, and D. Each node B and D is specialized. For example, the node B includes a greater amount of processing power, e.g., a greater number of CPUs and GPUs, than the nodes A and C. As another example, the node B includes a higher amount of memory, e.g., a larger number of memory devices, than that in the nodes A and C. As yet another example, the node B is the same as the node A or the node C except that the node B includes the greater amount of processing power and the higher amount of memory than the node A or the node C. As another example, the node D is the same as the node A or the node C except that the node D includes the greater amount of processing power and the higher amount of memory than the node A or the node C. Examples of the node A include the node 1 and the node 1A. Examples of the node B include the node 2, the node 2A, the node 2B and the node 2C.

The processor 350, illustrated in FIG. 3C, of the node assembly server 108 determines whether one or more of the nodes A and C have malfunctioned or are not functional. For example, the processor 350 sends a message via the communication device 354 of the node assembly server 108 and the computer network 112 to the network communication device 208A of the node 1 to respond to the message. Upon determining that the network communication 208A device does not respond to the message within a predetermined time, the processor 350 determines that the node 1 has malfunctioned or is not functioning. Upon determining that the nodes A and/or C have malfunctioned, the processor 350 selects the specialized node B via the switch system 106 to perform the functions being performed by the nodes A and/or C. For example, when the node A is nonfunctional or is malfunctioning, the processor 350 sends the information regarding the internal communication protocol to the specialized node B to allow the specialized node B to communicate with the node C that is functional.

In one embodiment, when the user 1 selects the game 2 that has a lower graphics level than the game 1 or in case of a device handover, the processor 350 reduces, in real-time, a number of nodes that execute the distributed game engine 102 for the game 1 to a lower number for executing a distributed game engine for the game 2. For example, the processor 350 selects the lower number of nodes via the switch system 106 for communicating internally with each other via the internal communication protocol and for executing the distributed game engine for the game 2. Similarly, when the user 1 selects the game 1 that has a higher graphics level than the game 2, the processor 350 increases, in real-time, a number of nodes are used to execute the distributed game engine 102 for the game 2 to a higher number for executing a distributed game engine for the game 1. For example, the processor 350 selects the higher number of nodes via the switch system 106 for communicating internally with each other via the internal communication protocol and for executing the distributed game engine for the game 1. As another example, a user is playing the game on his/her PlayStation™ game console. When the user steps out of his/her home, the user wishes to transfer the game to his/her smartphone or tablet. The smartphone or tablet displays the game in a low resolution and a low frame rate but the PlayStation™ game console in conjunction with the 4K or the 8K television applies a higher resolution and a higher frame rate. To satisfy the lower resolution and the lower frame rate, there is a decrease in the number of nodes.

In an embodiment, when a number of client devices facilitating a play of the game 1 via different user accounts reduces, the processor 350 reduces, in real-time, a number of nodes that execute the distributed game engine 102 for the game 1 to a lower number for executing a distributed game engine 102 for the game 1. On the other hand, when a number of client devices facilitating a play of the game 1 via different user accounts increases, the processor 350 increases, in real-time, a number of nodes are used to execute the distributed game engine 102 for the game 1 to a higher number for executing a distributed game engine 102 for the game 1.

Figure 10:
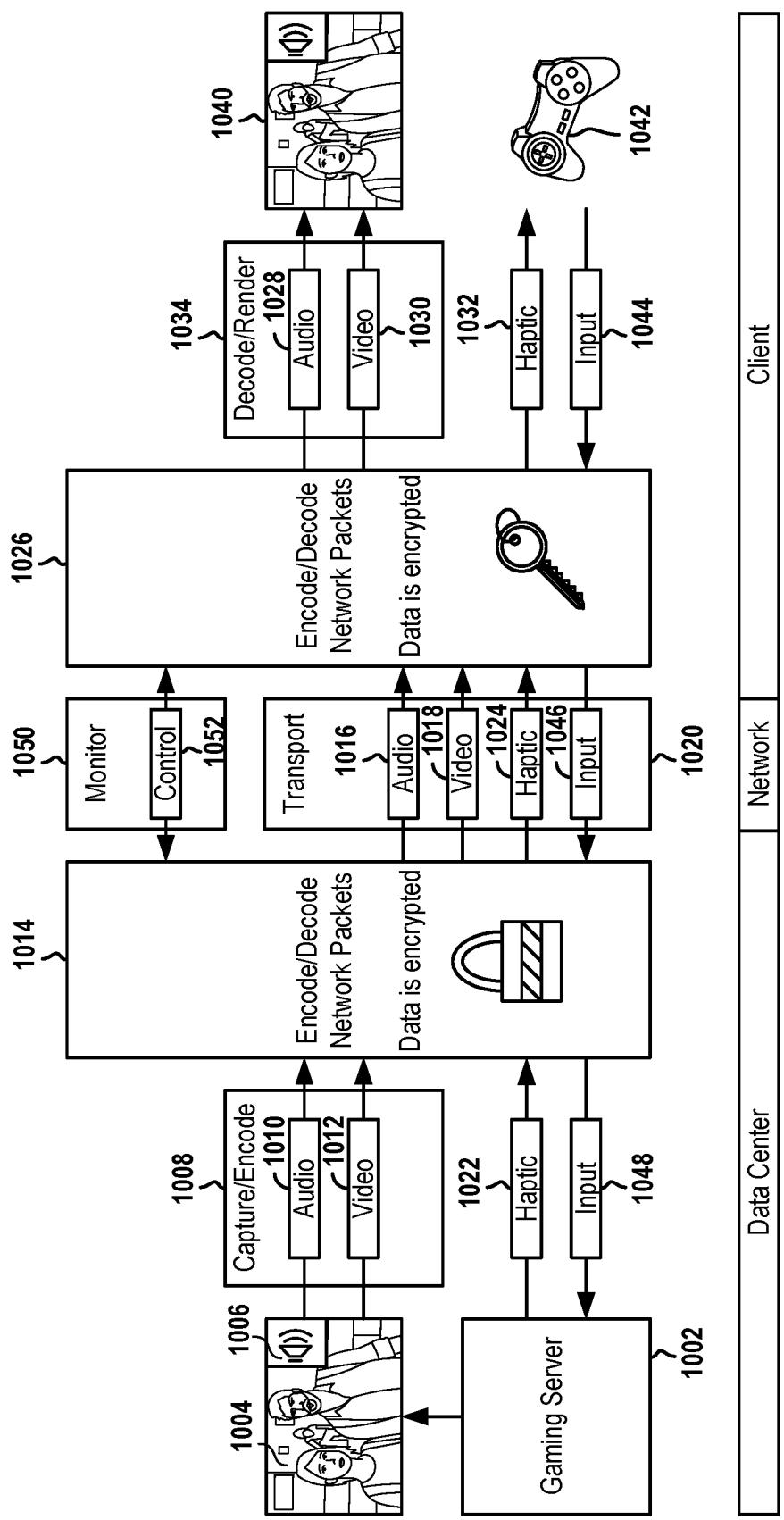
FIG. 10 is a flow diagram illustrating various operations, which are performed for streaming a cloud video game to a client device.

FIG. 10 is a flow diagram conceptually illustrating various operations which are performed for streaming a cloud video game to a client device, in accordance with implementations of the disclosure. A game server 1002 executes a video game and generates raw (uncompressed) video 1004 and audio 1006. The video 1004 and audio 1006 are captured and encoded for streaming purposes, as indicated at reference 1008 in the illustrated diagram. The encoding provides for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

Encoded audio 1010 and encoded video 1012 are further packetized into network packets, as indicated at reference numeral 1014, for purposes of transmission over the computer network such as the Internet. In some embodiments, the network packet encoding process also employs a data encryption process, thereby providing enhanced data security. In the illustrated implementation, audio packets 1016 and video packets 1018 are generated for transport over a computer network 1020.

The game server 1002 additionally generates haptic feedback data 1022, which is also packetized into network packets for network transmission. In the illustrated implementation, haptic feedback packets 1024 are generated for transport over the computer network 1020.

The foregoing operations of generating the raw video and audio and the haptic feedback data are performed on the game server 1002 of a data center, and the operations of encoding the video and audio, and packetizing the encoded audio/video and haptic feedback data for transport are performed by the streaming engine of the data center. As indicated at reference 1020, the audio, video, and haptic feedback packets are transported over the computer network. As indicated at reference 1026, the audio packets 1016, video packets 1018, and haptic feedback packets 1024, are disintegrated, e.g., parsed, etc., by a client device to extract encoded audio 1028, encoded video 1030, and haptic feedback data 1032 at the client device from the network packets. If data has been encrypted, then the data is also decrypted. The encoded audio 1028 and encoded video 1030 are then decoded by the client device, as indicated at reference 1034, to generate client-side raw audio and video data for rendering on a display device 1040 of the client device. The haptic feedback data 1032 is processed by the processor of the client device to produce a haptic feedback effect at a controller device 1042 or other interface device, e.g., the HMD, etc., through which haptic effects can be rendered. One example of a haptic effect is a vibration or rumble of the controller device 1042.

It will be appreciated that a video game is responsive to user inputs, and thus, a similar procedural flow to that described above for transmission and processing of user input, but in the reverse direction from client device to server, is performed. As shown, a controller device 1042 or another input device, e.g., the body part of the user 1, etc., or a combination thereof generates input data 1044. This input data 1044 is packetized at the client device for transport over the computer network to the data center. Input data packets 1046 are unpacked and reassembled by the game server 1002 to define input data 1048 on the data center side. The input data 1048 is fed to the game server 1002, which processes the input data 1048 to update save data for a game state of the game.

During transport via the computer network 1020 of the audio packets 1016, the video packets 1018, and haptic feedback packets 1024, in some embodiments, the transmission of data over the computer network 1020 is monitored to ensure a quality of service. For example, network conditions of the computer network 1020 are monitored as indicated by reference 1050, including both upstream and downstream network bandwidth, and the game streaming is adjusted in response to changes in available bandwidth. That is, the encoding and decoding of network packets is controlled based on present network conditions, as indicated by reference 1052.

Figure 11:
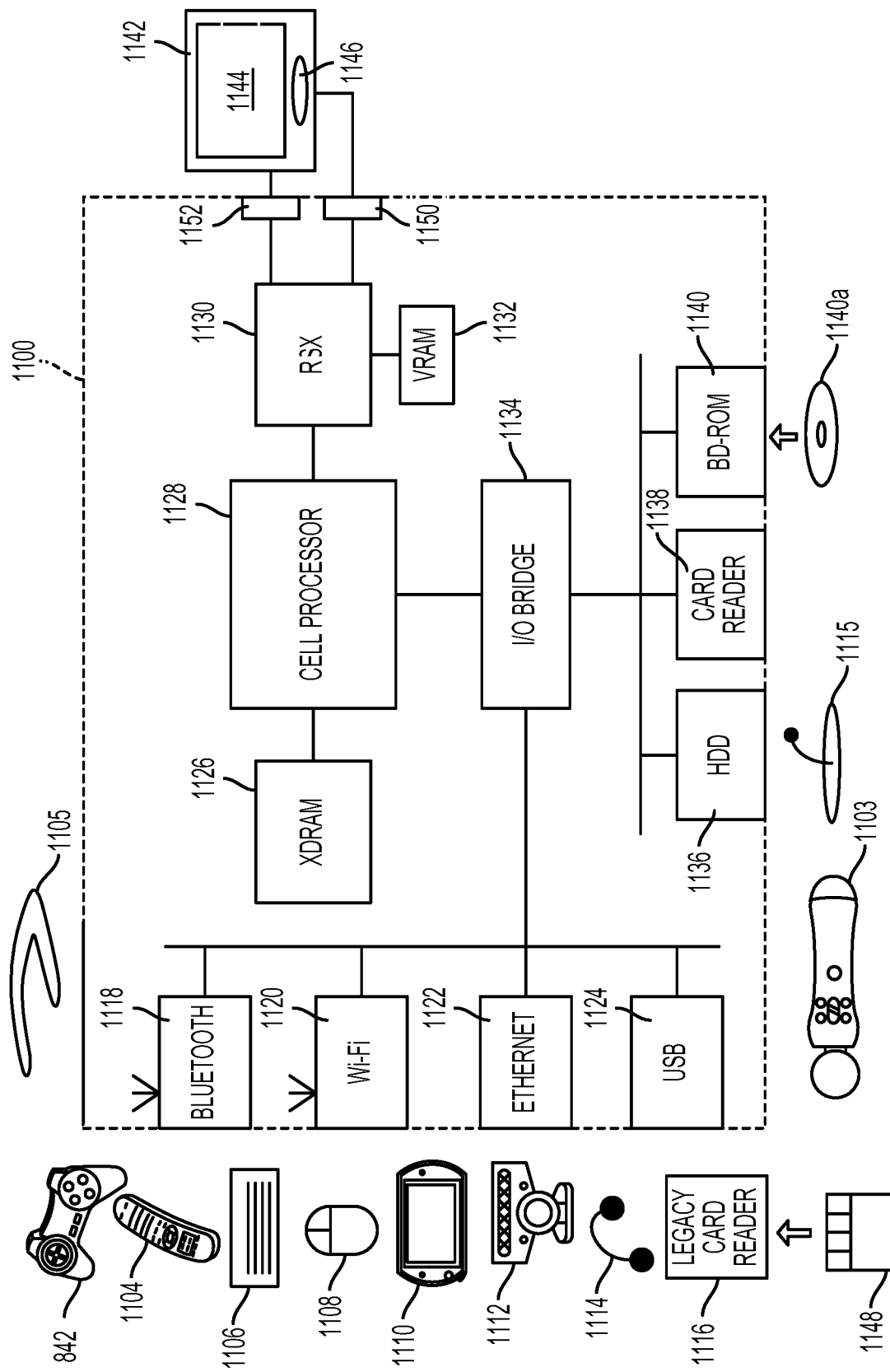
FIG. 11 is a block diagram of an embodiment of a game console that is compatible for interfacing with a display device of the client device or is capable of communicating via a computer network with a game hosting system.

FIG. 11 is a block diagram of an embodiment of a game console 1100 that is compatible for interfacing with the display device of the client device and is capable of communicating via the computer network 1020 with the game hosting system. The game console 1100 is located within a data center A or is located at a location at which the user 1 is located. In some embodiments, the game console 1100 is used to execute a game that is displayed on the HMD. The game console 1100 is provided with various peripheral devices connectable to the game console 1100. The game console 1100 has a cell processor 1128, a dynamic random access memory (XDRAM) unit 1126, a Reality Synthesizer graphics processor unit 1130 with a dedicated video random access memory (VRAM) unit 1132, and an input/output (I/O) bridge 1134. The game console 1100 also has a Blu Ray® Disk read-only memory (BD-ROM) optical disk reader 1140 for reading from a disk 1140*a* and a removable slot-in hard disk drive (HDD) 1136, accessible through the I/O bridge 1134. Optionally, the game console 1100 also includes a memory card reader 1138 for reading compact flash memory cards, memory Stick® memory cards and the like, which is similarly accessible through the I/O bridge 1134. The I/O bridge 1134 also connects to Universal Serial Bus (USB) 2.0 ports 1124, a gigabit Ethernet port 1122, an IEEE 802.11b/g wireless network (Wi-Fi) port 1120, and a Bluetooth® wireless link port 1118 capable of supporting Bluetooth connections.

In operation, the I/O bridge 1134 handles all wireless, USB and Ethernet data, including data from game controllers 842 and/or 1103 and from the HMD 1105. For example, when the user A is playing a game generated by execution of a portion of a game code, the I/O bridge 1134 receives input data from the game controllers 842 and/or 1103 and/or from the HMD 1105 via a Bluetooth link and directs the input data to the cell processor 1128, which updates a current state of the game accordingly. As an example, a camera within the HMD 1105 captures a gesture of the user 1 to generate an image representing the gesture. The image is an example of the input data. Each game controller 842 and 1103 is an example of a hand-held controller (HHC).

The wireless, USB and Ethernet ports also provide connectivity for other peripheral devices in addition to game controllers 842 and 1103 and the HMD 1105, such as, for example, a remote control 1104, a keyboard 1106, a mouse 1108, a portable entertainment device 1110, such as, e.g., a Sony Playstation Portable® entertainment device, etc., a video camera, such as, e.g., an EyeToy® video camera 1112, etc., a microphone headset 1114, and a microphone 1115. In some embodiments, such peripheral devices are connected to the game console 1100 wirelessly, for example, the portable entertainment device 1110 communicates via a Wi-Fi ad-hoc connection, whilst the microphone headset 1114 communicates via a Bluetooth link.

The provision of these interfaces means that the game console 1100 is also potentially compatible with other peripheral devices such as digital video recorders (DVRs), set-top boxes, digital cameras, portable media players, Voice over Internet protocol (IP) telephones, mobile telephones, printers and scanners.

In addition, a legacy memory card reader 1116 is connected to the game console 1100 via the USB port 1124, enabling the reading of memory cards 1148 of a kind used by the game console 1100. The game controllers 842 and 1103 and the HMD 1105 are operable to communicate wirelessly with the game console 1100 via the Bluetooth link 1118, or to be connected to the USB port 1124, thereby also receiving power by which to charge batteries of the game controller 842 and 1103 and the HMD 1105. In some embodiments, each of the game controllers 842 and 1103 and the HMD 1105 includes a memory, a processor, a memory card reader, permanent memory, such as, e.g., flash memory, etc., light emitters such as, e.g., an illuminated spherical section, light emitting diodes (LEDs), or infrared lights, etc., microphone and speaker for ultrasound communications, an acoustic chamber, a digital camera, an internal clock, a recognizable shape, such as, e.g., a spherical section facing the game console 1100, and wireless devices using protocols, such as, e.g., Bluetooth, Wi-Fi, etc.

The game controller 842 is a controller designed to be used with two hands of the user 1, and game controller 1103 is a single-hand controller with an attachment. The HMD 1105 is designed to fit on top of a head and/or in front of eyes of the user 1. In addition to one or more analog joysticks and conventional control buttons, each game controller 842 and 1103 is susceptible to three-dimensional location determination. Similarly, the HMD 1105 is susceptible to three-dimensional location determination. Consequently, in some embodiments, gestures and movements by the user 1 of the game controller 842 and 1103 and of the HMD 1105 are translated as inputs to a game in addition to or instead of conventional button or joystick commands Optionally, other wirelessly enabled peripheral devices, such as, e.g., the Playstation™ Portable device, etc., are used as a controller. In the case of the Playstation™ Portable device, additional game or control information, e.g., control instructions or number of lives, etc., is provided on a display screen of the device. In some embodiments, other alternative or supplementary control devices are used, such as, e.g., a dance mat (not shown), a light gun (not shown), a steering wheel and pedals (not shown), bespoke controllers, etc. Examples of bespoke controllers include a single or several large buttons for a rapid-response quiz game (also not shown).

The remote control 1104 is also operable to communicate wirelessly with the game console 1100 via the Bluetooth link 1118. The remote control 1104 includes controls suitable for the operation of the Blu Ray™ Disk BD-ROM reader 1140 and for navigation of disk content.

The Blu Ray™ Disk BD-ROM reader 1140 is operable to read CD-ROMs compatible with the game console 1100, in addition to conventional pre-recorded and recordable CDs, and so-called Super Audio CDs. The Blu Ray™ Disk BD-ROM reader 1140 is also operable to read digital video disk-ROMs (DVD-ROMs) compatible with the game console 1100, in addition to conventional pre-recorded and recordable DVDs. The Blu Ray™ Disk BD-ROM reader 1140 is further operable to read BD-ROMs compatible with the game console 1100, as well as conventional pre-recorded and recordable Blu-Ray Disks.

The game console 1100 is operable to supply audio and video, either generated or decoded via the Reality Synthesizer graphics unit 1130, through audio connectors 1150 and video connectors 1152 to a display and sound output device 1142, such as, e.g., a monitor or television set, etc., having a display screen 1144 and one or more loudspeakers 1146, or to supply the audio and video via the Bluetooth® wireless link port 1118 to the display device of the HMD 1105. The audio connectors 1150, in various embodiments, include conventional analogue and digital outputs whilst the video connectors 1152 variously include component video, S-video, composite video, and one or more High Definition Multimedia Interface (HDMI) outputs. Consequently, video output may be in formats such as phase alternating line (PAL) or National Television System Committee (NTSC), or in 2220p, 1080i or 1080p high definition. Audio processing, e.g., generation, decoding, etc., is performed by the cell processor 1108. An operating system of the game console 1100 supports Dolby® 5.1 surround sound, Dolby® Theatre Surround (DTS), and the decoding of 7.1 surround sound from Blu-Ray® disks.

In some embodiments, a video camera, e.g., the video camera 1112, etc., comprises a single charge coupled device (CCD), an LED indicator, and hardware-based real-time data compression and encoding apparatus so that compressed video data is transmitted in an appropriate format such as an intra-image based motion picture expert group (MPEG) standard for decoding by the game console 1100. An LED indicator of the video camera 1112 is arranged to illuminate in response to appropriate control data from the game console 1100, for example, to signify adverse lighting conditions, etc. Some embodiments of the video camera 1112 variously connect to the game console 1100 via a USB, Bluetooth or Wi-Fi communication port. Various embodiments of a video camera include one or more associated microphones and also are capable of transmitting audio data. In several embodiments of a video camera, the CCD has a resolution suitable for high-definition video capture. In use, images captured by the video camera are incorporated within a game or interpreted as game control inputs. In another embodiment, a video camera is an infrared camera suitable for detecting infrared light.

In various embodiments, for successful data communication to occur with a peripheral device, such as, for example, a video camera or remote control via one of the communication ports of the game console 1100, an appropriate piece of software, such as, a device driver, etc., is provided.

In some embodiments, the aforementioned system devices, including the game console 1100, the HHC, and the HMD 1105 enable the HMD 1105 to display and capture video of an interactive session of a game. The system devices initiate an interactive session of a game, the interactive session defining interactivity between the user 1 and the game. The system devices further determine an initial position and orientation of the HHC and/or the HMD 1105 operated by the user 1. The game console 1100 determines a current state of a game based on the interactivity between the user 1 and the game. The system devices track a position and orientation of the HHC and/or the HMD 1105 during an interactive session of the user 1 with a game. The system devices generate a spectator video stream of the interactive session based on a current state of a game and the tracked position and orientation of the HHC and/or the HMD 1105. In some embodiments, the HHC renders the spectator video stream on a display screen of the HHC. In various embodiments, the HMD 1105 renders the spectator video stream on a display screen of the HMD 1105.

Figure 12:
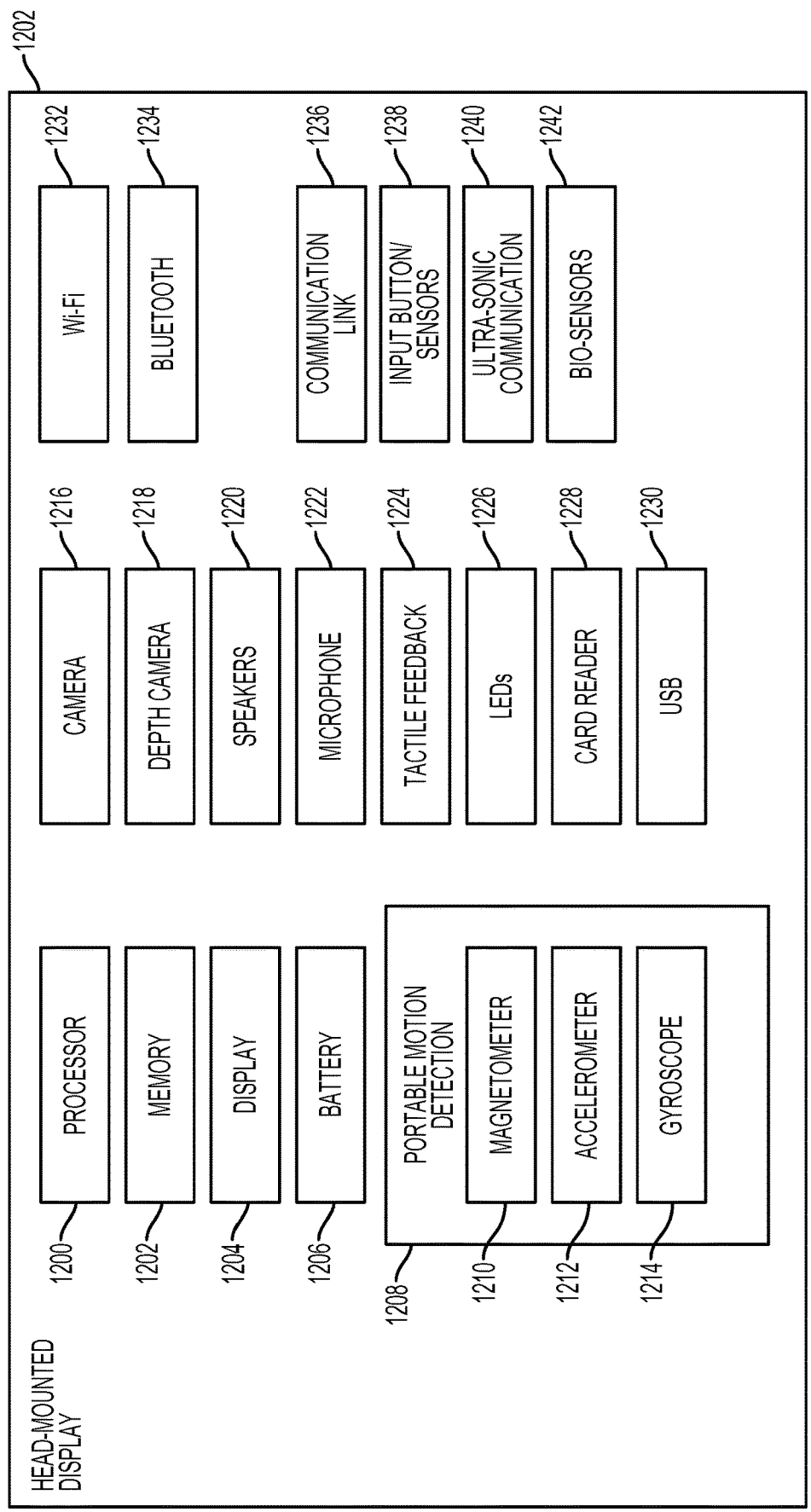
FIG. 12 is a diagram of an embodiment of a head-mounted display (HMD).

With reference to FIG. 12, a diagram illustrating components of an HMD 1202 is shown. The HMD 1202 is an example of the HMD 1105 (FIG. 11). The HMD 1202 includes a processor 1200 for executing program instructions. A memory device 1202 is provided for storage purposes. Examples of the memory device 1202 include a volatile memory, a non-volatile memory, or a combination thereof. A display device 1204 is included which provides a visual interface, e.g., display of image frames generated from save data, etc., that the user 1 (FIG. 1) views. A battery 1206 is provided as a power source for the HMD 1202. A motion detection module 1208 includes any of various kinds of motion sensitive hardware, such as a magnetometer 1210, an accelerometer 1212, and a gyroscope 1214.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1212 are used to provide the direction of gravity, which gives an absolute reference for two angles, e.g., world-space pitch and world-space roll, etc.

A magnetometer measures a strength and a direction of a magnetic field in a vicinity of the HMD 1202. In some embodiments, three magnetometers 1210 are used within the HMD 1202, ensuring an absolute reference for the world-space yaw angle. In various embodiments, the magnetometer is designed to span the earth magnetic field, which is ±80 microtesla. Magnetometers are affected by metal, and provide a yaw measurement that is monotonic with actual yaw. In some embodiments, a magnetic field is warped due to metal in the real-world environment, which causes a warp in the yaw measurement. In various embodiments, this warp is calibrated using information from other sensors, e.g., the gyroscope 1214, a camera 1216, etc. In one embodiment, the accelerometer 1212 is used together with magnetometer 1210 to obtain the inclination and azimuth of the HMD 1202.

A gyroscope is a device for measuring or maintaining orientation, based on the principles of angular momentum. In one embodiment, instead of the gyroscope 1214, three gyroscopes provide information about movement across the respective axis (x, y and z) based on inertial sensing. The gyroscopes help in detecting fast rotations. However, the gyroscopes, in some embodiments, drift overtime without the existence of an absolute reference. This triggers resetting the gyroscopes periodically, which can be done using other available information, such as positional/orientation determination based on visual tracking of an object, accelerometer, magnetometer, etc.

The camera 1216 is provided for capturing images and image streams of a real-world environment, e.g., room, cabin, natural environment, etc., surrounding the user 1. In various embodiments, more than one camera is included in the HMD 1202, including a camera that is rear-facing, e.g., directed away from the user 1 when the user 1 is viewing the display of the HMD 1202, etc., and a camera that is front-facing, e.g., directed towards the user 1 when the user 1 is viewing the display of the HMD 1202, etc. Additionally, in several embodiments, a depth camera 1218 is included in the HMD 1202 for sensing depth information of objects in the real-world environment.

The HMD 1202 includes speakers 1220 for providing audio output. Also, a microphone 1222 is included, in some embodiments, for capturing audio from the real-world environment, including sounds from an ambient environment, and speech made by the user 1, etc. The HMD 1202 includes a tactile feedback module 1224, e.g., a vibration device, etc., for providing tactile feedback to the user 1. In one embodiment, the tactile feedback module 1224 is capable of causing movement and/or vibration of the HMD 1202 to provide tactile feedback to the user 1.

LEDs 1226 are provided as visual indicators of statuses of the HMD 1202. For example, an LED may indicate battery level, power on, etc. A card reader 1228 is provided to enable the HMD 1202 to read and write information to and from a memory card. A USB interface 1230 is included as one example of an interface for enabling connection of peripheral devices, or connection to other devices, such as other portable devices, computers, etc. In various embodiments of the HMD 1202, any of various kinds of interfaces may be included to enable greater connectivity of the HMD 1202.

A Wi-Fi module 1232 is included for enabling connection to the Internet via wireless networking technologies. Also, the HMD 1202 includes a Bluetooth module 1234 for enabling wireless connection to other devices. A communications link 1236 is also included, in some embodiments, for connection to other devices. In one embodiment, the communications link 1236 utilizes infrared transmission for wireless communication. In other embodiments, the communications link 1236 utilizes any of various wireless or wired transmission protocols for communication with other devices.

Input buttons/sensors 1238 are included to provide an input interface for the user 1 (FIG. 1). Any of various kinds of input interfaces are included, such as buttons, touchpad, joystick, trackball, etc. An ultra-sonic communication module 1240 is included, in various embodiments, in the HMD 1202 for facilitating communication with other devices via ultra-sonic technologies.

Bio-sensors 1242 are included to enable detection of physiological data from a user. In one embodiment, the bio-sensors 1242 include one or more dry electrodes for detecting bio-electric signals of the user through the user's skin.

The foregoing components of HMD 1202 have been described as merely exemplary components that may be included in HMD 1202. In various embodiments, the HMD 1202 include or do not include some of the various aforementioned components.

Figure 13:
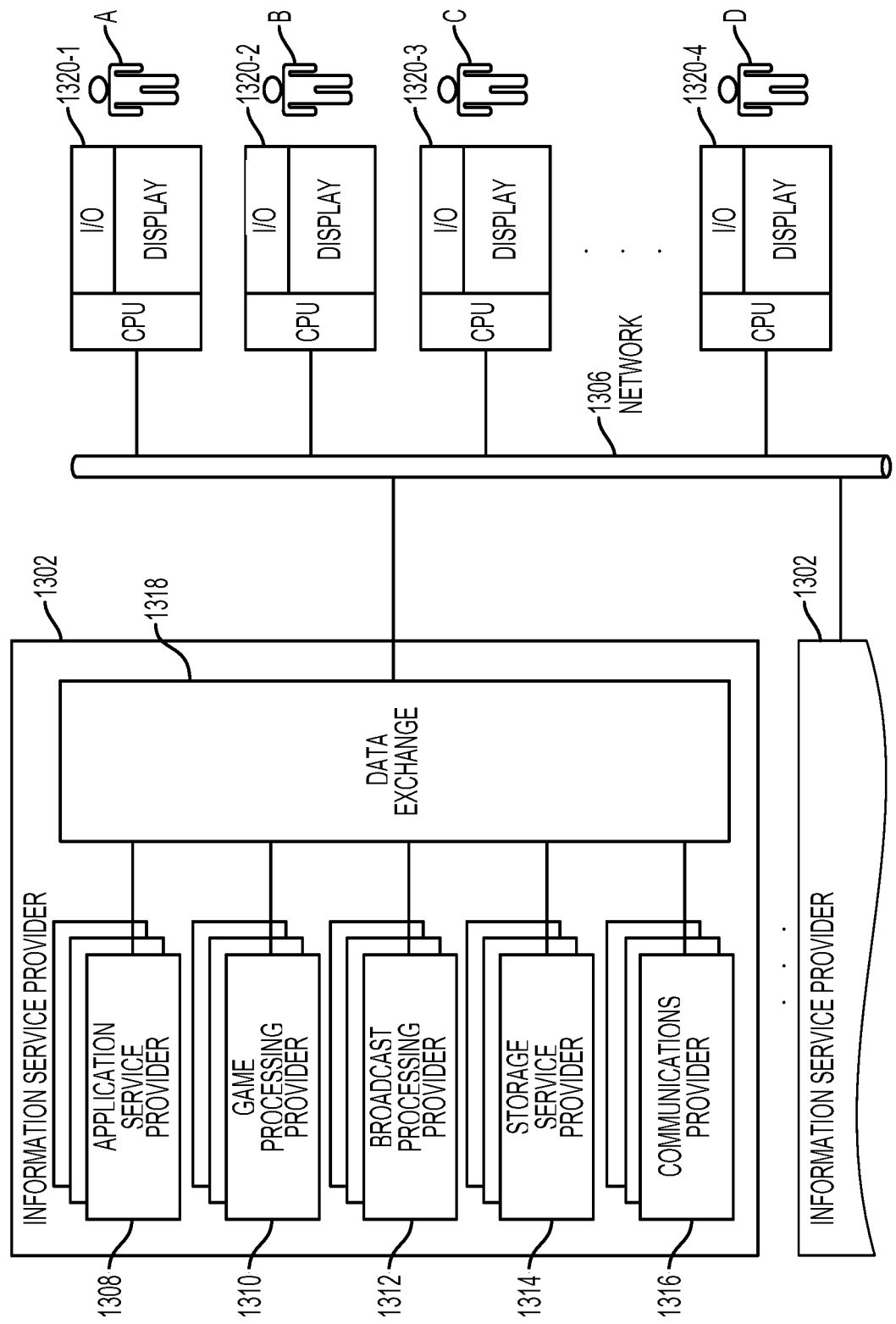
FIG. 13 illustrates an embodiment of an Information Service Provider (INSP) architecture.

FIG. 13 illustrates an embodiment of an Information Service Provider (INSP) architecture. INSPs 1302 delivers a multitude of information services to users A, B, C, and D geographically dispersed and connected via a computer network 1306, e.g., a LAN, a WAN, or a combination thereof, etc. An example of the WAN includes the Internet and an example of the LAN includes an Intranet. The user 1 operates a client device 1320-1, the user B operates another client device 1320-2, the user C operates yet another client device 1320-3, and the user D operates another client device 1320-4.

In some embodiments, each client device 1320-1, 1320-2, 1320-3, and 1320-4 includes a central processing unit (CPU), a display, and an input/output (I/O) interface. Examples of each client device 1320-1, 1320-2, 1320-3, and 1320-4 include a personal computer (PC), a mobile phone, a netbook, a tablet, a gaming system, a personal digital assistant (PDA), the game console 1100 and a display device, the HMD 1202 (FIG. 11), the game console 1100 and the HMD 1202, a desktop computer, a laptop computer, a smart television, etc. In some embodiments, the INSP 1302 recognizes a type of a client device and adjusts a communication method employed.

In some embodiments, an INSP delivers one type of service, such as stock price updates, or a variety of services such as broadcast media, news, sports, gaming, etc. Additionally, the services offered by each INSP are dynamic, that is, services can be added or taken away at any point in time. Thus, an INSP providing a particular type of service to a particular individual can change over time. For example, the client device 1320-1 is served by an INSP in near proximity to the client device 1320-1 while the client device 1320-1 is in a home town of the user 1, and client device 1320-1 is served by a different INSP when the user 1 travels to a different city. The home-town INSP will transfer requested information and data to the new INSP, such that the information "follows" the client device 1320-1 to the new city making the data closer to the client device 1320-1 and easier to access. In various embodiments, a master-server relationship is established between a master INSP, which manages the information for the client device 1320-1, and a server INSP that interfaces directly with the client device 1320-1 under control from the master INSP. In some embodiments, data is transferred from one ISP to another ISP as the client device 1320-1 moves around the world to make the INSP in better position to service client device 1320-1 be the one that delivers these services.

The INSP 1302 includes an Application Service Provider (ASP) 1308, which provides computer-based services to customers over the computer network 1306. Software offered using an ASP model is also sometimes called on-demand software or software as a service (SaaS). A simple form of providing access to a computer-based service, e.g., customer relationship management, etc., is by using a standard protocol, e.g., a hypertext transfer protocol (HTTP), etc. The application software resides on a vendor's server and is accessed by each client device 1320-1, 1320-2, 1320-3, and 1320-4 through a web browser using a hypertext markup language (HTML), etc., by a special purpose client software provided by the vendor, and/or other remote interface, e.g., a thin client, etc.

Services delivered over a wide geographical area often use cloud computing. Cloud computing is a style of computing in which dynamically scalable and often virtualized resources are provided as a service over the computer network 1306. The users A, B, C, and D do not need to be an expert in the technology infrastructure in the "cloud" that supports them. Cloud computing is divided, in some embodiments, in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the computer network 1306, e.g., using servers, storage and logic, etc., based on how the computer network 1306 is depicted in computer network diagrams and is an abstraction for the complex infrastructure it conceals.

Further, the INSP 1302 includes a game processing provider (GPP) 1310, also sometime referred to herein as a game processing server, which is used by the client devices 1320-1, 1320-2, 1320-3, and 1320-4 to play single and multiplayer video games. Most video games played over the computer network 1306 operate via a connection to a game server. Typically, games use a dedicated server application that collects data from the client devices 1320-1, 1320-2, 1320-3, and 1320-4 and distributes it to other clients that are operated by other users. This is more efficient and effective than a peer-to-peer arrangement, but a separate server is used to host the server application. In some embodiments, the GPP 1310 establishes communication between the client devices 1320-1, 1320-2, 1320-3, and 1320-4, which exchange information without further relying on the centralized GPP 1310.

Dedicated GPPs are servers which run independently of a client. Such servers are usually run on dedicated hardware located in data centers, providing more bandwidth and dedicated processing power. Dedicated servers are a method of hosting game servers for most PC-based multiplayer games. Massively multiplayer online games run on dedicated servers usually hosted by the software company that owns the game title, allowing them to control and update content.

A broadcast processing server (BPS) 1312, sometimes referred to herein as a broadcast processing provider, distributes audio or video signals to an audience. Broadcasting to a very narrow range of audience is sometimes called narrowcasting. A final leg of broadcast distribution is how a signal gets to the client devices 1320-1, 1320-2, 1320-3, and 1320-4, and the signal, in some embodiments, is distributed over the air as with a radio station or a television station to an antenna and receiver, or through a cable television or cable radio or "wireless cable" via the station. The computer network 1306 also brings, in various embodiments, either radio or television signals to the client devices 1320-1, 1320-2, 1320-3, and 1320-4, especially with multicasting allowing the signals and bandwidth to be shared. Historically, broadcasts are delimited, in several embodiments, by a geographic region, e.g., national broadcasts, regional broadcasts, etc. However, with the proliferation of high-speed Internet, broadcasts are not defined by geographies as content can reach almost any country in the world.

A storage service provider (SSP) 1314 provides computer storage space and related management services. The SSP 1314 also offers periodic backup and archiving. By offering storage as a service, the client devices 1320-1, 1320-2, 1320-3, and 1320-4 use more storage compared to when storage is not used as a service. Another major advantage is that the SSP 1314 includes backup services and the client devices 1320-1, 1320-2, 1320-3, and 1320-4 will not lose data if their hard drives fail. Further, a plurality of SSPs, in some embodiments, have total or partial copies of the data received from the client devices 1320-1, 1320-2, 1320-3, and 1320-4, allowing the client devices 1320-1, 1320-2, 1320-3, and 1320-4 to access data in an efficient way independently of where the client devices 1320-1, 1320-2, 1320-3, and 1320-4 are located or of types of the clients. For example, the user 1 accesses personal files via a home computer, as well as via a mobile phone while the user 1 is on the move.

A communications provider 1316 provides connectivity to the client devices 1320-1, 1320-2, 1320-3, and 1320-4. One kind of the communications provider 1316 is an Internet service provider (ISP) which offers access to the computer network 1306. The ISP connects the client devices 1320-1, 1320-2, 1320-3, and 1320-4 using a data transmission technology appropriate for delivering Internet Protocol datagrams, such as dial-up, digital subscriber line (DSL), cable modem, fiber, wireless or dedicated high-speed interconnects. The communications provider 1316 also provides, in some embodiments, messaging services, such as e-mail, instant messaging, and short message service (SMS) texting. Another type of a communications Provider is a network service provider (NSP), which sells bandwidth or network access by providing direct backbone access to the computer network 1306. Examples of network service providers include telecommunications companies, data carriers, wireless communications providers, Internet service providers, cable television operators offering high-speed Internet access, etc.

A data exchange 1318 interconnects the several modules inside INSP 1302 and connects these modules to the client devices 1320-1, 1320-2, 1320-3, and 1320-4 via computer network 1306. The data exchange 1318 covers, in various embodiments, a small area where all the modules of INSP 1302 are in close proximity, or covers a large geographic area when the different modules are geographically dispersed. For example, the data exchange 1302 includes a fast Gigabit Ethernet within a cabinet of a data center, or an intercontinental virtual LAN.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a ROM, a RAM, a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A server system for facilitating a play of a game, comprising:
a first server node; and
a second server node,
wherein the first server node is configured to produce a first set of information to facilitate generation of a first image frame portion associated with the game, wherein the first server node is configured to send the first set of information to the second server node,
wherein the first server node is configured to produce a second set of information to facilitate generation of a second image frame portion associated with the game, wherein the first server node is configured to send the second set of information to the second server node,
wherein the second server node is configured to generate the first image frame portion associated with the game based on the first set of information,
wherein the second server node is configured to generate a second image frame portion associated with the game based on the second set of information,
wherein the second server node is configured to generate an image frame having the first and second image frame portions.

2. The server system of claim 1, further comprising a node assembly server and a third server node, wherein the node assembly server is configured to select the first and second server nodes from among the first through third server nodes to facilitate execution of a distributed game engine to enable generation of the first image frame portion.

3. The server system of claim 2, wherein the node assembly server is configured to select the first and second server nodes from among the first through third server nodes based on a subscription level associated with a user account or a level of graphics of the game or a combination thereof.

4. The server system of claim 2, wherein the node assembly server is configured to select the first and second server nodes from among the first through third server nodes to achieve a frame rate of displaying a plurality of images on a client device.

5. The server system of claim 2, wherein the first server node includes a processing unit configured to execute a portion of the distributed game engine to generate the first set of information and the second server node includes a processing unit configured to execute a second portion of the distributed game engine to generate the first image frame portion.

6. The server system of claim 1, wherein the first set of information based on which the first image frame portion is generated includes a position of a virtual object, an orientation of the virtual object, a size of the virtual object, and a shape of the virtual object.

7. The server system of claim 6, wherein the second server node is configured to apply a rendering code to the first set of information to generate graphics of the first image frame portion.

8. The server system of claim 1, wherein the second server node is configured to apply a rendering code to the first set of information to generate graphics of the first image frame portion.

9. A server system for facilitating a play of a game, comprising:
a first server node; and
a second server node,
wherein the first server node is configured to produce a first set of information to facilitate generation of a first image frame associated with the game, wherein the first server node is configured to send the first set of information to the second server node,
wherein the second server node is configured to generate the first image frame associated with the game based on the first set of information,
wherein the second server node is configured to generate a second set of information based on the first set of information, wherein the second server node is configured to send the second set of information to the first server node,
wherein the first server node is configured to generate a second image frame associated with the game based on the second set of information,
wherein the first server node is configured to send the first and second image frames to a client device via a computer network for display of the first and second image frames in a consecutive order.

10. The server system of claim 9, further comprising a node assembly server and a third server node, wherein the node assembly server is configured to select the first and second server nodes from among the first through third server nodes to facilitate execution of a distributed game engine to enable generation of the first and second image frames.

11. The server system of claim 10, wherein the node assembly server is configured to select the first and second server nodes from among the first through third server nodes based on a subscription level associated with a user account or a level of graphics of the game or a combination thereof.

12. The server system of claim 10, wherein the node assembly server is configured to select the first and second server nodes from among the first through third server nodes to achieve a frame rate of displaying a plurality of images on a client device.

13. The server system of claim 10, wherein the first server node includes a processing unit configured to execute a first portion of the distributed game engine to generate the first set of information and the second server node includes a processing unit configured to execute a second portion of the distributed game engine to generate the first image frame.

14. The server system of claim 9, wherein the first set of information for generating the first image frame includes a position of a virtual object, an orientation of the virtual object, a size of the virtual object, and a shape of the virtual object.

15. The server system of claim 14, wherein the second server node includes a processing unit configured to apply a rendering code to the first set of information to generate graphics of the first image frame.

16. The server system of claim 9, wherein the second server node includes a processing unit configured to apply a rendering code to the first set of information to generate graphics of the first image frame.

17. The server system of claim 9, wherein the first server node includes a processing unit configured to produce a third set of information to facilitate generation of a plurality of additional image frames associated with the game, wherein the first server node includes an internal communication device configured to send the third set of information to the second server node, wherein the second server node includes a processing unit configured to generate the plurality of additional image frames associated with the game based on the third set of information.

18. The server system of claim 17, wherein the second server node includes an encoder configured to encode the first image frame and the plurality of additional image frames to generate a plurality of encoded image frames, wherein the second server node includes a network communication device configured to send the plurality of encoded image frames via a computer network to a client device.

19. The server system of claim 17, wherein the second server node includes an internal communication device configured to send the first image frame and the plurality of additional image frames to the first server node, wherein the first server node includes an encoder configured to encode the first image frame, the second image frame, and the plurality of additional image frames to generate a plurality of encoded image frames, wherein the first server node includes a network communication device configured to send the plurality of encoded image frames via a computer network to a client device.

20. A method for facilitating a play of a game, comprising:
producing, by a first server node, a first set of information;
producing, by the first server node, a second set of information;
sending, by the first server node to a second server node, the first set of information;
sending, from the first server node to the second server node, the second set of information;
generating, by the second server node, a first image frame portion associated with the game based on the first set of information;
generating, by the second server node, a second image frame portion associated with the game based on the second set of information; and
generating, by the second server node, an image frame having the first and second image frame portions.

21. The method of claim 20, further comprising selecting, by a node assembly server, the first and second server nodes from among the first server node, the second server node, and a third server node to facilitate execution of a distributed game engine to enable generation of the first image frame portion and the second image frame portion.

* * * * *